US012536963B2

(12) United States Patent
Lee et al.

(10) Patent No.: US 12,536,963 B2
(45) Date of Patent: Jan. 27, 2026

(54) PIXEL CIRCUIT AND DISPLAY DEVICE INCLUDING THE SAME

(71) Applicant: LG Display Co., Ltd., Seoul (KR)

(72) Inventors: Jung Hoon Lee, Paju-si (KR); Hyung Uk Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/810,287

(22) Filed: Aug. 20, 2024

(65) Prior Publication Data

US 2025/0118264 A1 Apr. 10, 2025

(51) Int. Cl.
*G09G 3/32* (2016.01)
*G09G 3/3258* (2016.01)

(52) U.S. Cl.
CPC ............ *G09G 3/3258* (2013.01); *G09G 3/32* (2013.01); *G09G 2320/0233* (2013.01)

(58) Field of Classification Search
CPC .................................................. G09G 3/3233
See application file for complete search history.

(56) References Cited

U.S. PATENT DOCUMENTS

2016/0224157 A1* 8/2016 Yang .................. G06F 3/04184
2017/0032736 A1* 2/2017 Gu ...................... G09G 3/3208
2020/0098315 A1* 3/2020 Lim ....................... G06F 3/042
2021/0272519 A1* 9/2021 Cao ...................... G09G 3/3233
2022/0122524 A1* 4/2022 Cho ......................... G09G 3/32
2023/0055132 A1* 2/2023 Lee .................. G02F 1/133608

FOREIGN PATENT DOCUMENTS

KR 20220013676 A 2/2022
KR 20230018731 A 2/2023

* cited by examiner

*Primary Examiner* — Nan-Ying Yang
(74) *Attorney, Agent, or Firm* — Seed Intellectual Property Law Group LLP

(57) ABSTRACT

The present disclosure relates to a pixel circuit and a display device including the same. The pixel circuit includes: a first driving transistor including a first electrode connected to a first node to which a driving voltage is applied, a gate electrode connected to a second node, and a second electrode connected to a third node; a second driving transistor including a first electrode connected to the first node, a gate electrode connected to a fifth node, and a second electrode connected to a sixth node; and a sensing part configured to sense electrical characteristics of the first driving transistor and the second driving transistor.

19 Claims, 21 Drawing Sheets

PIXEL CIRCUIT AND DISPLAY DEVICE INCLUDING THE SAME

CROSS-REFERENCE TO RELATED APPLICATION

This application claims priority to and the benefit of Korean Patent Application No. 10-2023-0132371, filed Oct. 5, 2023, the disclosure of which is incorporated herein by reference in its entirety for all purpose as if fully set forth herein.

BACKGROUND

Technical Field

The present disclosure relates to a pixel circuit and a display device including the same, and more particularly, for example, without limitation, to a pixel circuit capable of sensing an electrical characteristic of a light-emitting element while driving the light-emitting element for displaying an image, and a display device including the pixel circuit.

Description of the Related Art

A flat panel display devices include a liquid crystal display (LCD), an electroluminescence display, a field emission display (FED), a plasma display panel (PDP), and a micro LED (Micro Light Emitting Diode) display device, and the like. The electroluminescent display may be classified into an inorganic light-emitting display device and an organic light-emitting display device according to the material of a light emission layer.

An active matrix type electroluminescent luminescent display includes a self-luminous light-emitting diode (hereinafter referred to as "LED") and a driving element for driving the LED. The driving element is implemented as a transistor, which can regulate the current flowing to the LED according to data. An electrical characteristic of the driving element, such as threshold voltage, mobility, or the like should be the same for all pixels, but the electrical characteristic of the driving element may not be uniform due to process conditions, driving environment, and the like. As the driving element runs for a longer period of time, stress may build on it and thus its electrical characteristic may deteriorate.

BRIEF SUMMARY

The present disclosure has been made in an effort to address aforementioned necessities and/or drawbacks.

The present disclosure provides a pixel circuit capable of sensing an electrical characteristic of a light-emitting element while driving the light-emitting element for displaying an image, and a display device including the pixel circuit.

The problem to be solved by the present disclosure is not limited to those mentioned above, and other problems not mentioned will be clearly understood by those skilled in the art from the following description, and may be more clearly understood based on embodiments according to the present disclosure. Further, it will be easily understood that the purposes and advantages according to the present disclosure may be realized using means shown in the claims or combinations thereof.

A pixel circuit according to one exemplary embodiment of the present disclosure, includes: a first driving transistor including a first electrode connected to a first node to which a driving voltage is applied, a gate electrode connected to a second node, and a second electrode connected to a third node; a second driving transistor including a first electrode connected to the first node, a gate electrode connected to a fifth node, and a second electrode connected to a sixth node; and a sensing part configured to sense electrical characteristics of the first driving transistor and the second driving transistor.

The sensing part may include a first sensing part connected to the third node and configured to sense an electrical characteristic of the first driving transistor; and a second sensing part connected to the sixth node and configured to sense an electrical characteristic of the second driving transistor.

The pixel circuit may further include a first capacitor connected between the second node and a fourth node; a first switch transistor configured to be turned on in response to a first selection signal to connect the third node to the fourth node; a second switch transistor configured to be turned on in response to a first scan signal to supply a first data voltage to the second node; a second capacitor connected between the fourth node and the fifth node; a third switch transistor configured to be turned on in response to a second selection signal to connect the sixth node to the fourth node; and a fourth switch transistor configured to be turned on in response to a second scan signal to supply a second data voltage to the fifth node.

The pixel circuit may further include a light-emitting element connected to the fourth node.

The first sensing part may include a first sensing capacitor connected to a first sensing line; a first sensing switch transistor configured to be turned on in response to a first sensing signal to connect the third node to the first sensing line; a first initialization switch element configured to be turned on in response to a first switch control signal to supply a first reference voltage to the first sensing line; a first analog to digital converter configured to convert a first sensing voltage input through the first sensing line into digital data; and a first sampling switch element configured to be turned on in response to a second switch control signal to connect the first sensing line to an input terminal of the first analog to digital converter.

The second sensing part may include a second sensing capacitor connected to a second sensing line; a second sensing switch transistor configured to be turned on in response to a second sensing signal to connect the sixth node to the second sensing line; a second initialization switch element configured to be turned on in response to a third switch control signal to supply a second reference voltage to the second sensing line; a second analog to digital converter configured to convert a second sensing voltage input through the second sensing line into digital data; and a second sampling switch element configured to be turned on in response to a fourth switch control signal to connect the second sensing line to an input terminal of the second analog to digital converter.

During a first driving period, the first driving transistor may be driven and the second driving transistor may be sensed. During a second driving period, the second driving transistor may be driven and the first driving transistor may be sensed.

During the first driving period, a light-emitting element connected to the fourth node may be driven by the first driving transistor, and the second driving transistor may be sensed by the second sensing part. During the second driving period, the light-emitting element may be driven by the second driving transistor and the first driving transistor may be sensed by the first sensing part.

During the first driving period, a voltage of the first selection signal may be a gate-on voltage, and a voltage of the second selection signal may be a gate-off voltage. During the second driving period, the voltage of the second selection signal may be the gate-on voltage and the voltage of the first selection signal may be the gate-off voltage.

During the first driving period, the first switch transistor may be configured to be turned on in response to the gate-on voltage of the first selection signal, and the second switch transistor may be configured to be turned off in response to the gate-off voltage of the second selection signal. During the second driving period, the first switch transistor may be configured to be turned off in response to the gate-off voltage of the first selection signal, and the second switch transistor may be configured to be turned on in response to the gate-on voltage of the second selection signal.

The first switch transistor may be turned on in response to the gate-on voltage of the first selection signal and turned off in response to the gate-off voltage of the first selection signal. The second switch transistor may be turned on in response to the gate-on voltage of the second selection signal and turned off in response to the gate-off voltage of the second selection signal.

During the first driving period, the first switch transistor and the second switch transistor may be configured to be turned on, while the third switch transistor may be configured to be turned off.

During a first period of the first driving period, the first switch transistor, the second switch transistor, the fourth switch transistor, the first sensing switch transistor, the first initialization switch element, and the second initialization switch element may be configured to be turned on, while the third switch transistor, the second sensing switch transistor, the first sampling switch element, and the second sampling switch element may be configured to be turned off.

During a second period of the first driving period, the first switch transistor, the second switch transistor, the fourth switch transistor, the first sensing switch transistor, the second sensing switch transistor, and the first initialization switch element may be configured to be turned on, while the third switch transistor, the second initialization switch element, the first sampling switch element, and the second sampling switch element may be configured to be turned off.

During a third period of the first driving period, the first switch transistor, the second switch transistor, the first sensing switch transistor, the first initialization switch element, and the second sampling switch element may be configured to be turned on, and the third switch transistor, the fourth switch transistor, the second sensing switch transistor, the second initialization switch element, and the first sampling switch element may be configured to be turned off.

During the second driving period, the third switch transistor, the fourth switch transistor may be configured to be turned on, while the first switch transistor may be configured to be turned off.

During a first period of the second driving period, the second switch transistor, the third switch transistor, the fourth switch transistor, the second sensing switch transistor, the first initialization switch element, and the second initialization switch element may be turned on, while the first switch transistor, the first sensing switch transistor, the first sampling switch element, and the second sampling switch element may be turned off.

During a second period of the second driving period, the second switch transistor, the third switch transistor, the fourth switch transistor, the first sensing switch transistor, the second sensing switch transistor, and the second initialization switch element may be turned on, while the first switch transistor, the first initialization switch element, the first sampling switch element, and the second sampling switch element may be turned off.

During a third period of the second driving period, the third switch transistor, the fourth switch transistor, the second sensing switch transistor, the second initialization switch element, and the first sampling switch element may be turned on, while the first switch transistor, the second switch transistor, the first sensing switch transistor, the first initialization switch element, and the second sampling switch element may be turned off.

The pixel circuit may further include a light-emitting element connected to the fourth node; and a fifth switch transistor connected between the fourth node and the light-emitting element and configured to connect the fourth node to an anode electrode of the light-emitting element in response to a light emission signal.

The pixel circuit may further include a first light-emitting element including an anode electrode and a cathode electrode; a second light-emitting element including an anode electrode and a cathode electrode; a fifth switch element configured to be turned on in response to a first light emission signal to connect the fourth node to the anode electrode of the first light-emitting element; and a sixth switch element configured to be turned on in response to a second light emission signal to connect the fourth node to the anode electrode of the second light-emitting element.

The sensing part may be connected to the third node and the sixth node. The pixel circuit may further include a light-emitting element connected to the fourth node.

The sensing part may include a sensing capacitor connected to a sensing line; a first sensing switch transistor configured to be turned on in response to a first sensing signal to connect the third node to the sensing line; a second sensing transistor configured to be turned on in response to a second sensing signal to connect the sixth node to the sensing line; an initialization switch element configured to be turned on in response to a first switch control signal to supply a reference voltage to the sensing line; an analog to digital converter configured to convert a sensing voltage input through the sensing line into digital data; and a sampling switch element configured to be turned on in response to a second switch control signal to connect the sensing line to an input terminal of the analog to digital converter.

A display device according to one exemplary embodiment of the present disclosure, includes: a display panel in which a plurality of data lines, a plurality of gate lines, and a plurality of display pixels are disposed. Each of the display pixels may include the pixel circuit.

A display device according to another exemplary embodiment of the present disclosure, includes: a display panel to which pixel data of an input image are written; and a backlight unit in which a plurality of local dimming pixels that irradiate light to the display panel is disposed. Each of the local dimming pixels may include the pixel circuit.

According to the present disclosure, a plurality of driving elements for driving a light-emitting element of a display pixel or a local dimming pixel may be connected to the light-emitting element, the light-emitting element may be emitted by any one of the driving elements, and at the same time the electrical characteristic of other driving elements may be sensed in real time.

According to the present disclosure, it is possible to freely select a driving element for driving the light-emitting element and a driving element to be sensed by using selection signals for controlling switch elements connected between the driving elements and the light-emitting element.

According to the present disclosure, a plurality of light-emitting elements may be simultaneously emitted, thereby increasing the luminance of the display pixel or the local dimming pixel increases with a small current. As a result, the present disclosure may improve the deterioration, power consumption, and lifespan of the driving elements and the light-emitting elements, and reproduce HDR (high dynamic range) images with high luminance and high contrast ratio.

The effects of the present disclosure are not limited to the above-mentioned effects, and other effects that are not mentioned will be apparently understood by those skilled in the art from the following description and the appended claims.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The above and other objects, features, and advantages of the present disclosure will become more apparent to those of ordinary skill in the art by describing exemplary embodiments thereof in detail with reference to the attached drawings, in which.

Figure 1:
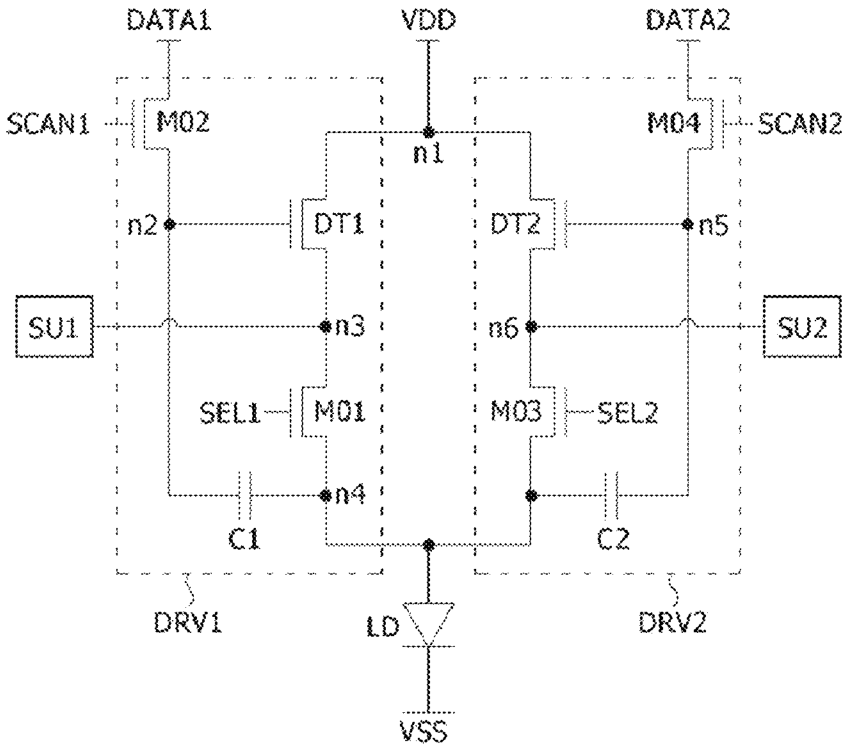
FIG. 1 is a circuit diagram illustrating a pixel circuit according to a first exemplary embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. The progression of processing steps and/or operations described is an example; however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

The advantages and features of the present disclosure and methods for accomplishing the same will be more clearly understood from exemplary embodiments described below with reference to the accompanying drawings. However, the present disclosure is not limited to the following exemplary embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “containing” and the like used herein are generally intended to allow other components to be added unless the terms are used with the term “only.” Any references to singular may include plural unless expressly stated otherwise.

Components are interpreted to include an ordinary error range even if not expressly stated.

In construing an element, the element is construed as including an error region although there is no explicit description thereof. Any implementation described herein as an “example” is not necessarily to be construed as preferred or advantageous over other implementations.

When a positional or interconnected relationship is described between two components, such as “on top of,” “above,” “below,” “beneath,” “next to,” “connect or couple with,” “crossing,” “intersecting,” or the like, one or more other components may be interposed between them, unless “immediately” or “directly” is used. For example, where an element or layer is disposed "on" another element or layer, a third layer or element may be interposed therebetween.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

When a temporal antecedent relationship is described, such as "after," "following," "next to," "before," or the like, it may not be continuous on a time base unless "just," "immediately" or "directly" is used.

The terms "first," "second," "A," "B," "(a)," and "(b)," and the like may be used to distinguish components from each other, but the functions or structures of the components are not limited by ordinal numbers or component names in front of the components. For example, a first element could be termed a second element, and, similarly, a second element could be termed a first element, without departing from the scope of the present disclosure.

It should be understood that the term "at least one" includes all combinations related with any one item. For example, "at least one among a first element, a second element and a third element" may include all combinations of two or more elements selected from the first, second and third elements as well as each individual element of the first, second and third elements.

The following exemplary embodiments can be partially or entirely bonded to or combined with each other and can be linked and operated in technically various ways. The exemplary embodiments can be carried out independently of or in association with each other.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

Hereinafter, the aspect of the present disclosure will be described with reference to the accompanying drawings. Since a scale of each of elements shown in the accompanying drawings is different from an actual scale for convenience of description, the present disclosure is not limited to the shown scale. Further, all the components of each display apparatus, display device, and display panel according to all aspects of the present disclosure are operatively coupled and configured.

The pixel circuit and the gate drive circuit of the display device may include a plurality of transistors. The transistor may be implemented as a thin film transistor (TFT). The transistors may be implemented as an oxide thin film transistor (TFT) including an oxide semiconductor, a low temperature poly silicon TFT (LTPS TFT) including a low temperature poly silicon, and the like. Hereinafter, the pixel circuit refers to a display pixel circuit for driving a light-emitting element of a display panel that visually reproduces the input image by writing pixel data of the input image, and a local dimming pixel circuit for driving a light source that radiates light to the display panel.

The display device according to an exemplary embodiment may be an electroluminescent display device. The electroluminescent display device may be any one of an organic light emitting diode (OLED) display device, a quantum-dot light emitting diode display device, an inorganic light emitting diode display device, and micro-LED display device, etc., without being limited thereto.

A transistor may be a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor (n-channel metal-oxide semiconductor (NMOS)), since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor can be referred to as a first electrode and a second electrode, and the present disclosure is not limited thereto. Alternatively, a source and a drain of a transistor can be referred to as a second electrode and a first electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various exemplary embodiments of the present disclosure will be described in detail with reference to the accompanying drawings.

Referring to FIG. 1, a pixel circuit according to one exemplary embodiment of the present disclosure may include a light-emitting element LD, first and second driving parts DRV1 and DRV2 for driving the light-emitting element LD, without being limited thereto. The pixel circuit may further include first and second sensing parts SU1 and SU2. The first sensing part SU1 is connected to the first driving part DRV1. The second sensing part SU2 is connected to the second driving part DRV2.

The first and second driving parts DRV1 and DRV2 may be driven alternately to slow down the acceleration of deterioration according to the driving time. During a first driving period, the first driving part DRV1 may drive the light-emitting element LD, while the second driving part DRV2 may be sensed. During a second driving period, the second driving part DRV2 may drive the light-emitting element LD, while the first driving part DRV1 may be sensed. However, the present disclosure is not limited thereto. For example, the first driving part DRV1 is sensed by the first sensing part SU1, and the second driving part DRV2 is sensed by the second sensing part SU2.

A driving cycle of each of the first and second driving parts DRV1 and DRV2 may be a predetermined time, for example, a quantitative time such as a day or a month. Further, the driving cycle of each of the first and second driving parts DRV1 and DRV2 may be a driving duration during which it continuously drives, such as a predetermined threshold time, for example, 1 hour or 10 hours. For example, the light-emitting element LD may be driven by the first driving part DRV1 for 1 hour, then the light-emitting element LD may be driven by the second driving part DRV2 for 1 hour, and then the light-emitting element LD may be driven by the first driving part DRV1 again for 1 hour.

The driving part DRV1 or DRV2 stops its driving while its electrical characteristic is sensed by its corresponding sensing part SU1 or SU2, and the other driving part DRV2 or DRV1 may be driven at this time. For example, the second driving part DRV2 may be sensed and compensated while the light-emitting element LD is driven by the first driving part DRV1, and then the first driving part DRV1 may be sensed and compensated while the light-emitting element LD is driven by the second driving part DRV2.

As one example, the first driving part DRV1 may include at least a first driving element DT1, a first switch element M01, a second switch element M02, a first capacitor C1, and the like. As one example, the second driving part DRV2 may include at least a second driving element DT2, a third switch element M03, a fourth switch element M04, a second capacitor C2, and the like. Each of the driving elements DT1 and DT2 and the switch elements M01 to M04 may be implemented as a transistor, and the present disclosure is not limited thereto.

The light-emitting element LD may be implemented as an organic light-emitting diode (hereinafter referred to as "OLED") or as an inorganic light-emitting element (LED), and the present disclosure is not limited thereto. An anode electrode of the light-emitting element LD may be connected to a fourth node n4 of the first driving part DRV1, and a cathode electrode of the light-emitting element LD may be connected to a node to a cathode voltage VSS is applied. When the light-emitting element LD is implemented as the OLED, the light-emitting element LD includes an organic compound layer formed between the anode electrode and the cathode electrode. The organic compound layer may include, but is not limited to, a hole injection layer (HIL), a hole transport layer (HTL), an light emission layer (EML), an electron transport layer (ETL), and an electron injection layer (EIL). The OLED may be implemented as a tandem structure with a plurality of light-emitting layers stacked on top of each other. The OLED having the tandem structure may improve the luminance and lifespan of sub-pixels.

The first driving element DT1 may be connected between a first node n1 and a third node n3. The first driving element DT1 drives the light-emitting element LD by generating a current according to the gate-source voltage Vgs and supplying the current to the light-emitting element LD. The first driving element DT1 includes a first electrode connected to the first node n1, a gate electrode connected to a second node n2, and a second electrode connected to the third node n3. A driving voltage VDD may be applied to the first node n1. The driving voltage VDD is a voltage higher than the cathode voltage VSS.

The first capacitor C1 may be connected between the second node n2 and the fourth node n4. A gate-source voltage Vgs of the first driving element DT is charged in in the first capacitor C1.

The first sensing part SU1 may be connected to the third node n3 to sense the voltage or current flowing at the third node n3. The voltage or current at the third node n3 may be changed depending on the electrical characteristic, for example, at least one of a threshold voltage and a mobility of the first driving element DT1. Thus, the first sensing part SU1 may sense the electrical characteristic of the first driving element DT1.

The first switch element M01 may be connected between the third node n3 and the fourth node n4. The first switch element M01 is turned on or off in response to a first selection signal SEL1. For example, the first switch element M01 is turned on in response to a gate-on voltage VGH of a first selection signal SEL1. When the first switch element M01 is turned on, the third node n3 is connected to the fourth node n4. The first switch element M01 includes a first electrode connected to the third node n3, a gate electrode to which the first selection signal SEL1 is applied, and a second electrode connected to the fourth node n4.

The second switch element M02 may be connected between a first data line to which the first data voltage DATA1 is applied and the second node n2. The second switch element M02 is turned on or off in response to the first scan signal SCAN1. For example, the second switch element M02 is turned on in response to the gate-on voltage VGH of the first scan signal SCAN1. When the second switch element M02 is turned on, the second switch element M02 supplies a first data voltage DATA1 to the second node n2. The second switch element M02 includes a first electrode connected to the first data line to which the first data voltage DATA1 is applied, a gate electrode to which the first scan signal SCAN1 is applied, and a second electrode connected to the second node n2.

The second driving element DT2 may be connected between the first node n1 and a sixth node n6. The second driving element DT2 drives the light-emitting element LD by generating a current according to the gate-source voltage Vgs and supplying the current to the light-emitting element LD. The second driving element DT2 includes a first electrode connected to the first node n1, a gate electrode connected to a fifth node n5, and a second electrode connected to the sixth node n6.

The second capacitor C2 may be connected between the fourth node n4 and the fifth node n5. The gate-source voltage Vgs of the second driving element DT2 is charged in the second capacitor C2.

The second sensing part SU2 is connected to the sixth node n6 to sense the voltage or current flowing at the sixth node n6. The voltage or current at the sixth node n6 may be changed depending on the electrical characteristic, for example, at least one of a threshold voltage and a mobility of the second driving element DT2. Thus, the second sensing portion SU2 may sense the electrical characteristic of the second driving element DT2.

The third switch element M03 may be connected between the sixth node n6 and the fourth node n4. The third switch element M03 is turned on or off in response to a second selection signal SEL2. For example, the third switch element M03 is turned on in response to the gate-on voltage VGH of the second selection signal SEL2, without being limited thereto. When the third switch element M03 is turned on, the sixth node n6 is connected to the fourth node n4. The third switch element M03 includes a first electrode connected to the sixth node n6, a gate electrode to which the second selection signal SEL2 is applied, and a second electrode connected to the fourth node n4.

The fourth switch element M04 may be connected between a second data line to which the second data voltage DATA2 and the fifth node n5. The fourth switch element M04 is turned on or off in response to the second scan signal SCAN2. For example, the fourth switch element M04 is turned on in response to the gate-on voltage VGH of the second scan signal SCAN2, without being limited thereto. When the fourth switch element M04 is turned on, the fourth switch element M04 supplies a second data voltage DATA2 to the fifth node n5. The fourth switch element M04 includes a first electrode connected to the second data line to which the second data voltage DATA2 is applied, a gate electrode to which the second scan signal SCAN2 is applied, and a second electrode connected to the fifth node n5.

The first data voltage DATA1 and the second data voltage DATA2 may be, but are not limited to, the same voltage. For example, when the first and second driving elements DT1 and DT2 have different accumulations of deterioration resulting in differences in their electrical characteristics, the first and second data voltages DATA1 and DATA2 may be different depending on the compensation level of the data voltages compensated according to the sensing results of the electrical characteristics of the first and second driving elements DT1 and DT2.

The light-emitting element LD may be a light-emitting element for a display pixel formed on the display panel or a local dimming light source that irradiates light onto the display panel. Accordingly, the pixel circuit illustrated in FIG. 1 may be at least one of a display pixel circuit of a display panel that visually reproduces an input image by writing pixel data of the input image, and a local dimming pixel circuit that drives a backlight light source to illuminate the transmissive display panel.

The first and second data voltages DATA1 and DATA2 applied to the display pixel circuit may be data voltages corresponding to grayscale or luminance value of the pixel data of the input image. The first and second data voltages DATA1 and DATA2 applied to the local dimming pixel circuit may be data voltages corresponding to local dimming luminance calculated based on the grayscale or luminance value of the pixel data of the input image.

Figure 2:
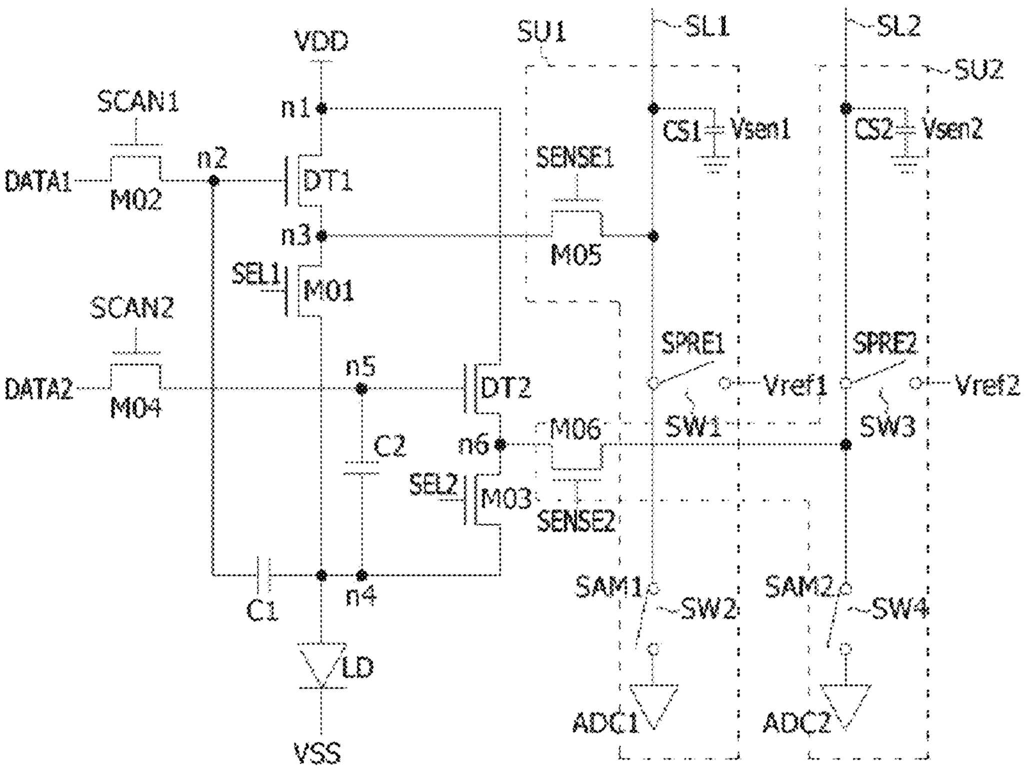
FIG. 2 is a circuit diagram illustrating an example of the sensing parts illustrated in FIG. 1 in detail.

FIG. 2 is a circuit diagram illustrating an example of the sensing parts SU1 and SU2 illustrated in FIG. 1 in detail. In the circuit illustrated in FIG. 2, substantially the same components as in FIG. 1 are designated by the same reference numerals, and detailed descriptions thereof will be omitted or briefly given.

The pixel circuit is connected to a plurality of data lines and gate lines. For example, the pixel circuit is connected to the data lines to which the data voltages DATA1 and DATA2 are applied and the gate lines to which the gate signals SCAN1, SCAN2, SEL1, and SEL2 are applied, without being limited thereto. The gate signals SCAN1, SCAN2, SEL1, and SEL2 include a first scan signal SCAN1 that is input to the pixel circuit through a first gate line, a second scan signal SCAN2 that is input to the pixel circuit through a second gate line, a first selection signal SEL1 that is input to the pixel circuit through a third gate line, and a second selection signal SEL2 that is input to the pixel circuit through a fourth gate line. In this case, a gate driving circuit may include, but is not limited to, a first shift register that sequentially supplies pulses of the first scan signal SCAN1 to the first gate line, a second shift register that sequentially supplies pulses of the second scan signal SCAN2 to the second gate line, a third shift register that sequentially supplies pulses of the first selection signal SEL1 to the third gate line, and a fourth shift register that sequentially supplies pulses of the second selection signal SEL2 to the fourth gate line.

The pulses of the gate signals SCAN1, SCAN2, SEL1, and SEL2 that swing between the gate-on voltage VGH and the gate-off voltage VGL. The switch elements in the pixel circuit are turned on or off according to the gate voltage applied to their gate electrodes. As one example, the switch elements M01 to M04 in the pixel circuit are turned on according to the gate-on voltage VGH applied to their gate electrodes, while they are turned off according to the gate-off voltage VGL, without being limited thereto.

The pixel circuit may be connected to a first power line to which the driving voltage VDD is applied and a second power line to which the cathode voltage VSS is applied. In addition, the pixel circuit may be connected to a first sensing line SL1 and a second sensing line SL2.

The driving voltage VDD may be set to a voltage higher than the maximum voltage of the data voltages DATA1 and DATA2. The driving voltage VDD is a voltage higher than the cathode voltage VSS. The first and second reference voltages Vref1 and Vref2 may be set to a voltage greater than or equal to the cathode voltage VSS. The first and second reference voltages Vref1 and Vref2 may be set to, but are not limited to, the same voltage. The gate-on voltage VGH may be set to a voltage higher than the driving voltage VDD, and the gate-off voltages VGL may be set to a voltage lower than the cathode voltage VSS. For example, but not limited to, VDD=15 to 20 [V], VSS=0 [V], Vref1=Vref2=1 to 3 [V], VGH=24 [V], and VGL=−12 [V]. The data voltage DATA1 and DATA2 may have a dynamic range between 0V and 18V, without being limited thereto.

As one example, the first sensing part SU1 may include a first sensing switch element M05, a first initialization switch element SW1, a first sampling switch element SW2, a first sensing capacitor CS1, and/or a first analog to digital converter (hereinafter referred to as "ADC") ADC1. Each of the switch elements M05, SW1, and SW2 may be implemented as a transistor, without being limited thereto. The first sensing capacitor CS1 is connected to the first sensing line SL1.

The first sensing switch element M05 may be connected between the third node n3 and the first sensing line SL1. The first sensing switch element M05 is turned on or off in response to a first sensing signal SENSE1. For example, the first sensing switch element M05 is turned on in response to the gate-on voltage VGH of the first sensing signal SENSE1 to connect the third node n3 to the first sensing line SL1. When the first sensing switch element M05 is turned on, the first sensing capacitor CS1 is charged by the charges from the third node n3. The first sensing switch element M05 includes a first electrode connected to the third node n3, a gate electrode to which the first sensing signal SENSE1 is applied, and a second electrode connected to the first sensing line SL1.

The pixel circuit may be connected to a fifth gate line to which the first sensing signal SENSE1 is applied. The gate driving circuit may further include a fifth shift register that sequentially outputs pulses of a gate signal for controlling the first sensing switch element M05, that is, the first sensing signal SENSE1, to the fifth gate line.

The first initialization switch element SW1 is turned on or off in response to a first switch control signal SPRE1. When first initialization switch element SW1 is turned on, the first initialization switch element SW1 applies the first reference voltage Vref1 to the first sensing line SL1. The first initialization switch element SW1 includes a first electrode connected to the first sensing line SL1, a gate electrode to which the first switch control signal SPRE1 is applied, and a second electrode to which the first reference voltage Vref1 is applied.

The first sampling switch element SW2 is turned on or off in response to a second switch control signal SAM1. When the first sampling switch element SW2 is turned on, the first sampling switch element SW2 connects the first sensing line SL1 to an input terminal of the first ADC ADC1. When the first sampling switch element SW2 is turned on, a first sensing voltage Vsen1 charged in the first sensing capacitor CS1 is input to the first ADC ADC1. The first sampling switch element SW2 includes a first electrode connected to the first sensing line SL1, a gate electrode to which the second switch control signal SAM1 is applied, and a second electrode connected to the input terminal of the first ADC ADC1.

The first ADC ADC1 converts the first sensing voltage Vsen1, which is input when the first sampling switch element SW2 is turned on, into digital data and outputs first sensing data. The first sensing data is input to a compensation part, which is omitted in the drawing. Based on the first sensing data, the compensation part may execute a compensation algorithm to compensate for the deterioration of the electrical characteristic of the first driving element DT1. Any known deterioration compensation algorithm may be used as the compensation algorithm. The compensation part may select a compensation value corresponding to the first sensing data and modulate the first data voltage DATA1 based on the compensation value, thereby compensating for the deterioration of the electrical characteristic of the first driving element DT1. For example, the compensation part may increase the first data voltage DATA1 by adding or multiplying the compensation value to the first compensation data (digital data). In this case, since the gate voltage of the first driving element DT1 rises, the gate-source voltage Vgs of the first driving element DT1 increases, and thus the deterioration of the electrical characteristic of the first driving element DT1 may be compensated. The first compensation data output from the compensation part may be converted to the first data voltage DATA1 by a digital to analog converter (hereinafter referred to as "DAC").

As one example, the second sensing section SU2 may include a second sensing switch element M06, a second initialization switch element SW3, a second sampling switch element SW4, a second sensing capacitor CS2, and/or a second ADC ADC2. Each of the switch elements M06, SW3, and SW4 may be implemented as a transistor, without being limited thereto. The second sensing capacitor CS2 is connected to the second sensing line SL2.

The second sensing switch element M06 may be connected between the sixth node n6 and the second sensing line SL2. The second sensing switch element M06 is turned on or off in response to a second sensing signal SENSE2. For example, the second sensing switch element M06 is turned on in response to the gate-on voltage VGH of the second sensing signal SENSE2 to connect the sixth node n6 to the second sensing line SL2. When the second sensing switch element M06 is turned on, the second sensing capacitor CS2 is charged by the charges from the sixth node n6. The second sensing switch element M06 includes a first electrode connected to the sixth node n6, a gate electrode to which the second sensing signal SENSE2 is applied, and a second electrode connected to the second sensing line SL2.

The pixel circuit may be connected to a sixth gate line to which the second sensing signal SENSE2 is applied. The gate driving circuit may further include a sixth shift register that sequentially outputs pulses of a gate signal for controlling the second sensing switch element M06, that is, the second sensing signal SENSE2, to the sixth gate line.

The second initialization switch element SW3 is turned on or off in response to a third switch control signal SPRE2. When the second initialization switch element SW3 is turned on, the second initialization switch element SW3 applies the second reference voltage Vref2 to the second sensing line SL2. The second initialization switch element SW3 includes a first electrode connected to the second sensing line SL2, a gate electrode to which the third switch control signal SPRE2 is applied, and a second electrode to which the second reference voltage Vref2 is applied.

The second sampling switch element SW4 is turned on or off in response to a fourth switch control signal SAM2. When the second sampling switch element SW4 is turned on, the second sampling switch element SW4 connects the second sensing line SL2 to an input terminal of the second ADC ADC2. When the second sampling switch element SW4 is turned on, a second sensing voltage Vsen2 charged in the second sensing capacitor CS2 is supplied to the second ADC ADC2. The second sampling switch element SW4 includes a first electrode connected to the second sensing line SL2, a gate electrode to which the fourth switch control signal SAM2 is applied, and a second electrode connected to the input terminal of the second ADC ADC2.

The second ADC ADC2 converts the second sensing voltage Vsen2, which is input when the second sampling switch element SW4 is turned on, into digital data and outputs second sensing data. The second sensing data is input to the compensation part, which is omitted in the drawing. Based on the second sensing data, the compensation part may execute the compensation algorithm to compensate for the deterioration of the electrical characteristic of the second driving element DT2. Any known deterioration compensation algorithm may be used as the compensation algorithm. The compensation part may select a compensation value corresponding to the second sensing data, and modulate the second data voltage DATA2 based on the compensation value to compensate for the deterioration of the electrical characteristic of the second driving element DT2. For example, the compensation part may increase the second data voltage DATA2 by adding or multiplying the compensation value to the second compensation data (digital data). In this case, since the gate voltage of the second driving element DT2 rises, the gate-source voltage Vgs of the second driving element DT2 increases, and thus the deterioration of the electrical characteristic of the second driving element DT2 may be compensated. The second compensation data output from the compensation part may be converted to the second data voltage DATA2 by the DAC.

The switch control signals SPRE1, SPRE2, SAM1, and SAM2 for controlling the initialization switch elements SW1 and SW3 and the sampling switch elements SW2 and SW4 may be generated by a separate controller, such as, but not limited to, a controller, without being limited thereto.

Figure 3:
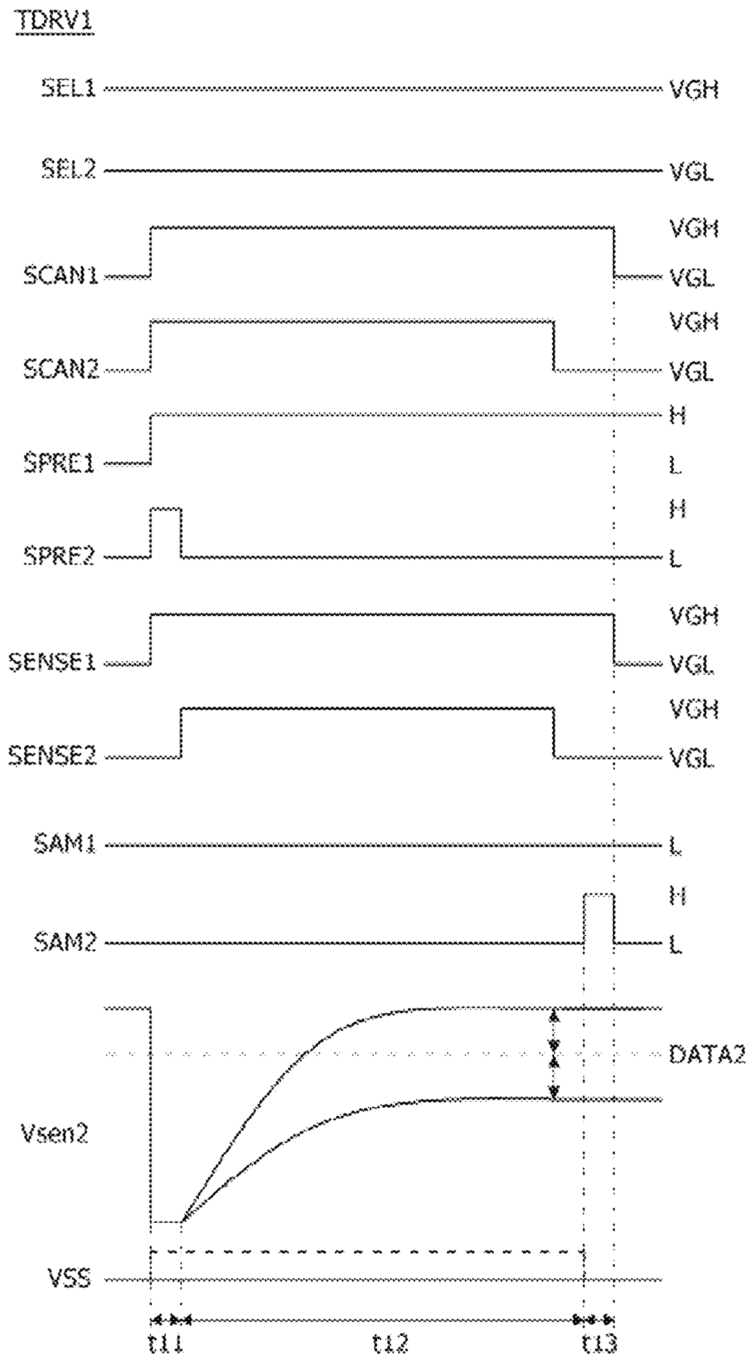
FIG. 3 is a waveform diagram illustrating signals input to the pixel circuit illustrated in FIG. 2 during a first driving period.
Figure 4A:
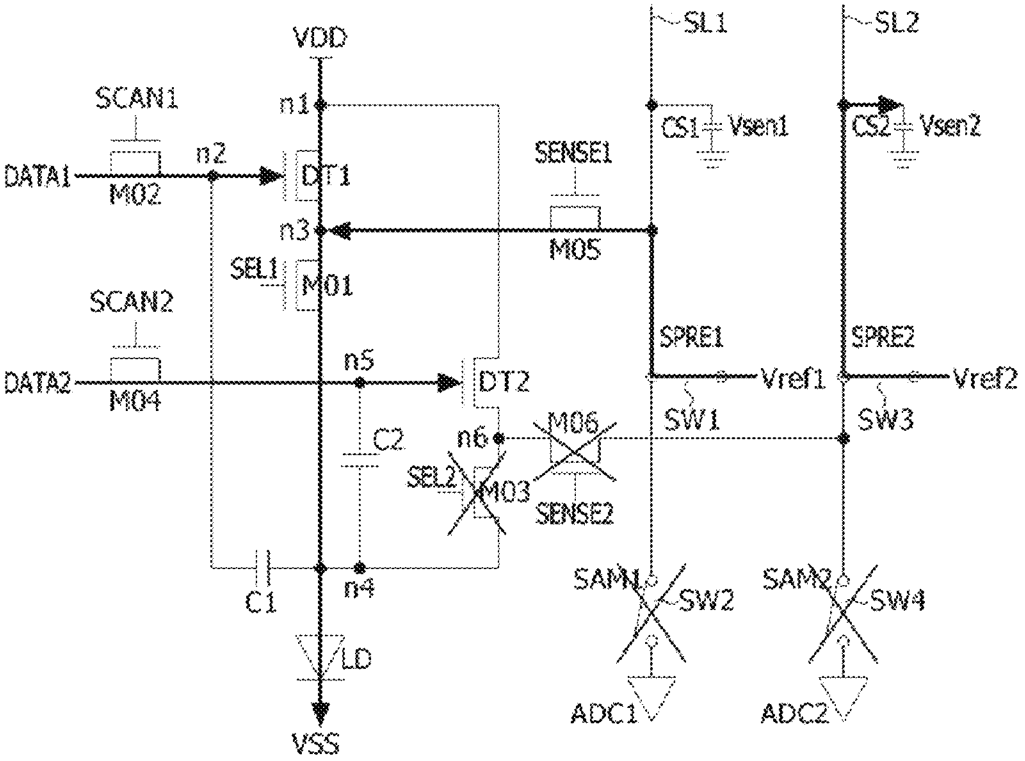
FIGS. 4A to 4C are circuit diagrams illustrating the operation of the pixel circuit illustrated in FIG. 2 in stages during the first driving period.
Figure 4B:
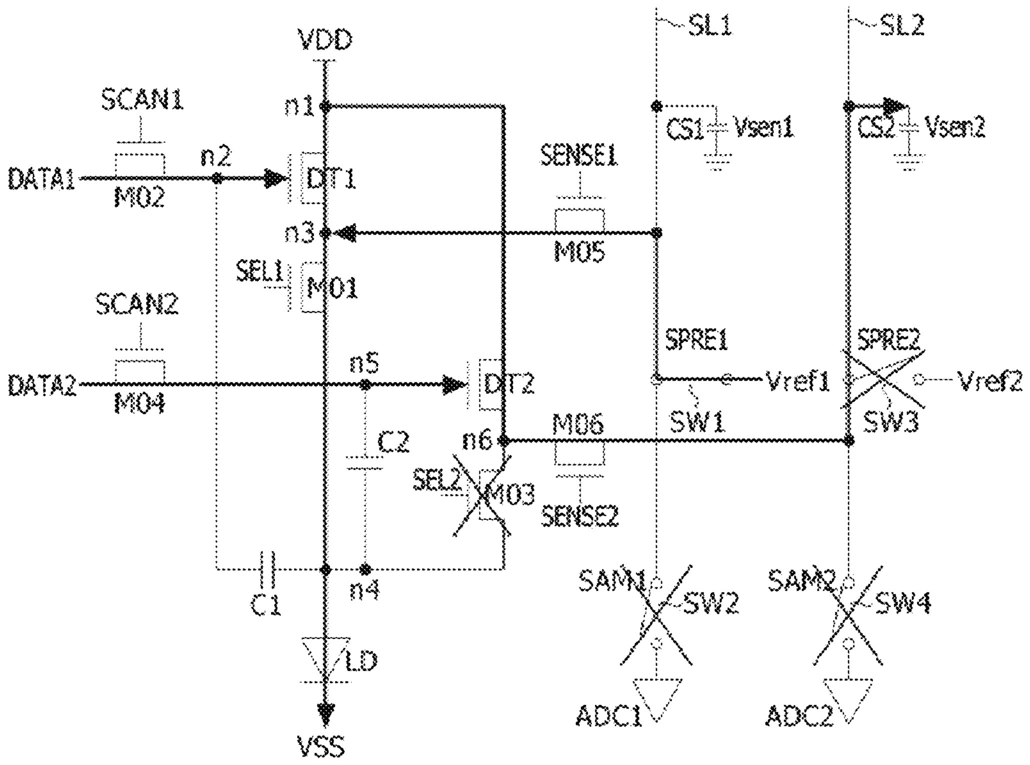
Figure 4C:
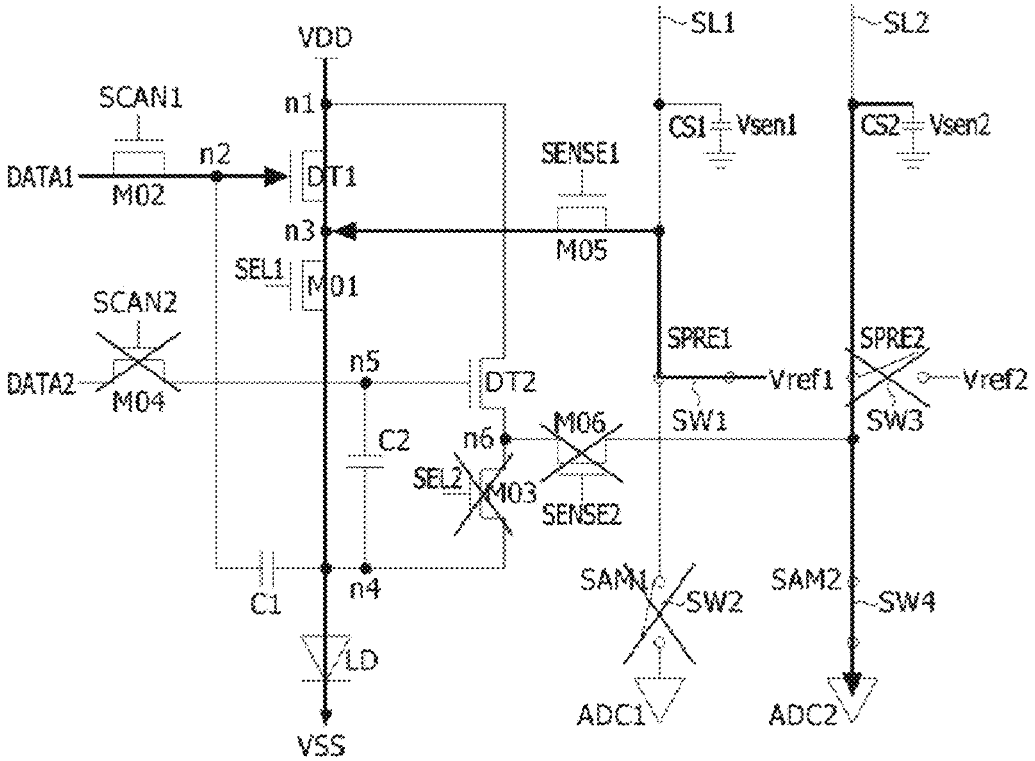

FIG. 3 is a waveform diagram illustrating signals input to the pixel circuit illustrated in FIG. 2 during a first driving period TDRV1. FIGS. 4A to 4C are circuit diagrams illustrating the operation of the pixel circuit illustrated in FIG. 2 in stages during the first driving period TDRV1. In FIG. 3, 'H' is the gate-on voltage of the switch control signals and 'L' is the gate-off voltage of the switch control signals. In FIGS. 4A to 4C, the bold lines represent the current flowing through the turned-on switch elements.

During the first driving period TDRV1, the first driving element DT1 is driven and the second driving element DT2 is sensed. For example, the light-emitting element LD may be driven by the first driving element DT1 and the second driving element DT2 is sensed by the second sensing part SU2. The first driving period TDRV1 may be divided into a first period t11, a second period t12, and a third period t13, as illustrated in FIG. 3, without being limited thereto.

As illustrated in FIG. 3, during the first driving period TDRV1, the first selection signal SEL1 may be the gate-on voltage VGH, while the second selection signal SEL2 may be the gate-off voltage VGL. Therefore, during the first driving period TDRV1, the first switch element M01 is turned on, while the third switch element M03 is in the off-state. Specifically, during the first driving period TDRV1, the first switch element M01 is turned on in response to the gate-on voltage VGH of the first selection signal SEL1, while the third switch element M03 is turned off in response to the gate-off voltage VGL of the second selection signal SEL2.

Referring to FIG. 3 and FIG. 4A, during the first period t11, the voltages of the first and second scan signals SCAN1 and SCAN2, the first and third switch control signals SPRE1 and SPRE2, and the first sensing signal SENSE1 are gate-on voltages (VGH, H). Therefore, during the first period t11, the first switch element M01, the second switch element M02, the fourth switch element M04, the first sensing switch element M05, the first initialization switch element SW1, and the second initialization switch element SW3 are turned on. At this time, the first data voltage DATA1 is charged in the first capacitor C1, and the second data voltage DATA2 is charged in the second capacitor C2.

During the first period t11, the voltages of the second sensing signal SENSE2, the second switch control signal SAM1, and the fourth switch control signal SAM2 is the gate-off voltage (VGL, L). Therefore, during the first period t11, the third switch element M03, the second sensing switch element M06, the first sampling switch element SW2, and the second sampling switch element SW4 are turned off.

During the first period t11, the first, second switch elements M01, M02 are turned on, and the third switch element M03 is turned off. During the first period t11, a current path may be formed between the driving voltage VDD and the cathode voltage VSS through the first driving element DT1 and the first switch element M01, so that the light-emitting element LD may be driven by the first driving element DT1, while the second driving part DRV2 may be sensed. In this case, the light intensity of the light-emitting element LD may be adjusted according to the first data voltage DATA1. At the same time, during the first period t11, the second sensing voltage Vsen2 is input to the second ADC ADC2, which outputs the second sensing data.

Referring to FIG. 3 and FIG. 4B, during the second period t12, the voltages of the first and second scan signals SCAN1 and SCAN2, the first switch control signal SPRE1, the first sensing signal SENSE1, and the second sensing signal SENSE2 are the gate-on voltage (VGH, H.) Therefore, during the second period t12, the first switch element M01, the second switch element M02, the fourth switch element M04, the first sensing switch element M05, the second sensing switch element M06, and the first initialization switch element SW1 are turned on.

During the second period t12, the voltages of the third switch control signal SPRE2, the second switch control signal SAM1, and the fourth switch control signal SAM2 are the gate-off voltage (VGL, L). Therefore, during the second period t12, the third switch element M03, the second initialization switch element SW3, the first sampling switch element SW2, and the second sampling switch element SW4 are turned off.

During the second period t12, the voltage of the sixth node n6 may rise, and the level of the rise may be different depending on the electrical characteristic of the second driving element DT2. At this time, the second sensing voltage Vsen2 sensed from the sixth node n6 is charged in the second sensing capacitor CS2. The second sensing voltage Vsen2 may be higher or lower than the second data voltage DATA2 depending on the electrical characteristic of the second driving element DT2.

During the second period t12, the first, second switch elements M01, M02 are turned on, and the third switch element M03 is turned off. During the second period t12, a current path is formed between the driving voltage VDD and the cathode voltage VSS through the first driving element DT1 and the first switch element M01, so that the light-emitting element LD may be driven by the first driving element DT1, while the second driving part DRV2 may be sensed. In this case, the light intensity of the light-emitting element LD may be adjusted according to the first data voltage DATA1. At the same time, during the second period t12, the second sensing voltage Vsen2 is input to the second ADC ADC2, which outputs the second sensing data.

Referring to FIG. 3 and FIG. 4C, during the third period t13, the voltages of the first scan signal SCAN1, the first switch control signal SPRE1, the first sensing signal SENSE1, and the fourth switch control signal SAM2 are the gate-on voltage (VGH, H). Therefore, during the third period t13, the first switch element M01, the second switch element M02, the first sensing switch element M05, the first initialization switch element SW1, and the second sampling switch element SW4 are turned on.

During the third period t13, the voltages of the second scan signal SCAN2, the second sensing signal SENSE2, the second switch control signal SAM1, and the third switch control signal SPRE2 is the gate-off voltage (VGL, L). Therefore, during the third period t13, the third switch element M03, the fourth switch element M04, the second sensing switch element M06, the second initialization switch element SW3, and the first sampling switch element SW2 are turned off.

During the third period t13, the first, second switch elements M01, M02 are turned on, and the third switch element M03 is turned off. During the third period t13, a current path is formed between the driving voltage VDD and the cathode voltage VSS through the first driving element DT1 and the first switch element M01, so that the light-emitting element LD may be driven by the first driving element DT1, while the second driving part DRV2 may be sensed. In this case, the light intensity of the light-emitting element LD may be adjusted according to the first data voltage DATA1. At the same time, during the third period t13, the second sensing voltage Vsen2 is input to the second ADC ADC2, which outputs the second sensing data. At the same time, during the third period t13, the second sensing voltage Vsen2 is input to the second ADC ADC2, which outputs the second sensing data.

Figure 5:
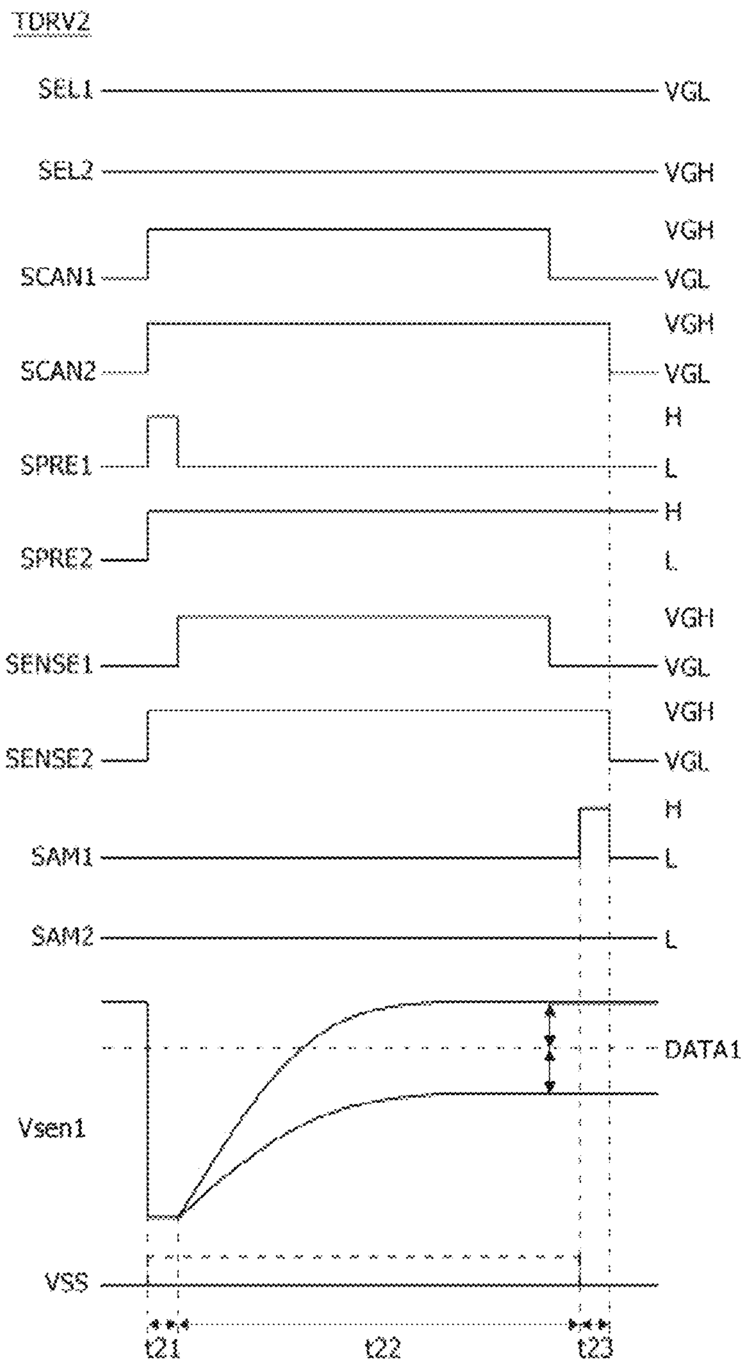
FIG. 5 is a waveform diagram illustrating signals input to the pixel circuit illustrated in FIG. 2 during a second driving period.
Figure 6A:
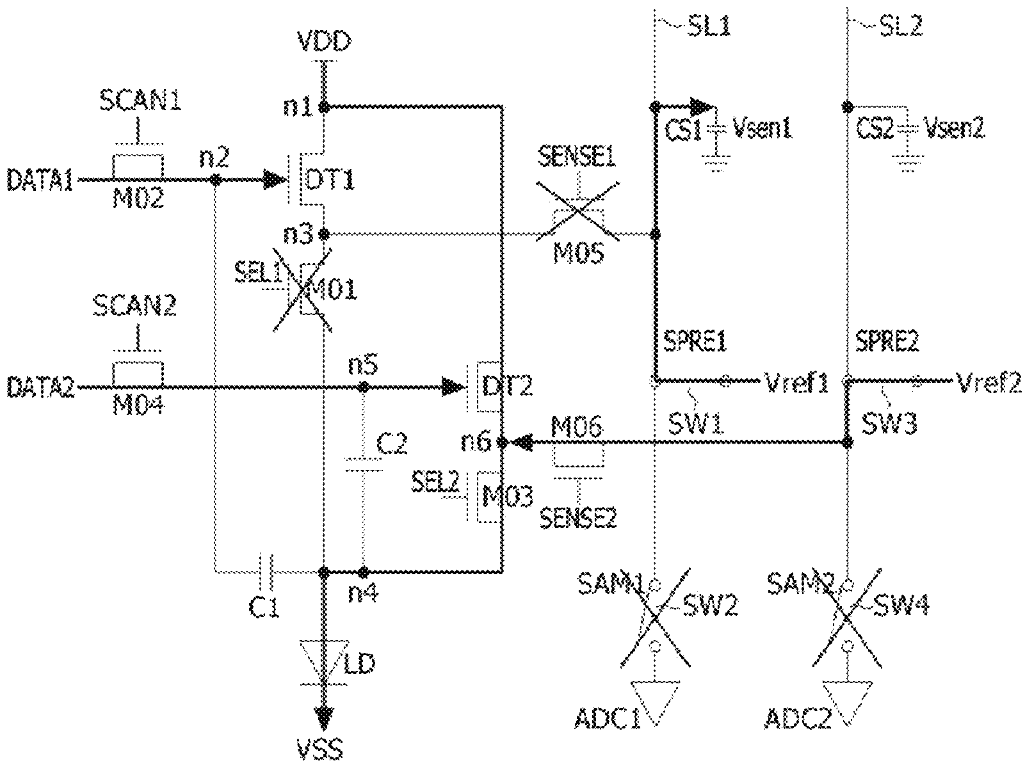
FIGS. 6A to 6C are circuit diagrams illustrating the operation of the pixel circuit illustrated in FIG. 2 in stages during the second driving period.
Figure 6B:
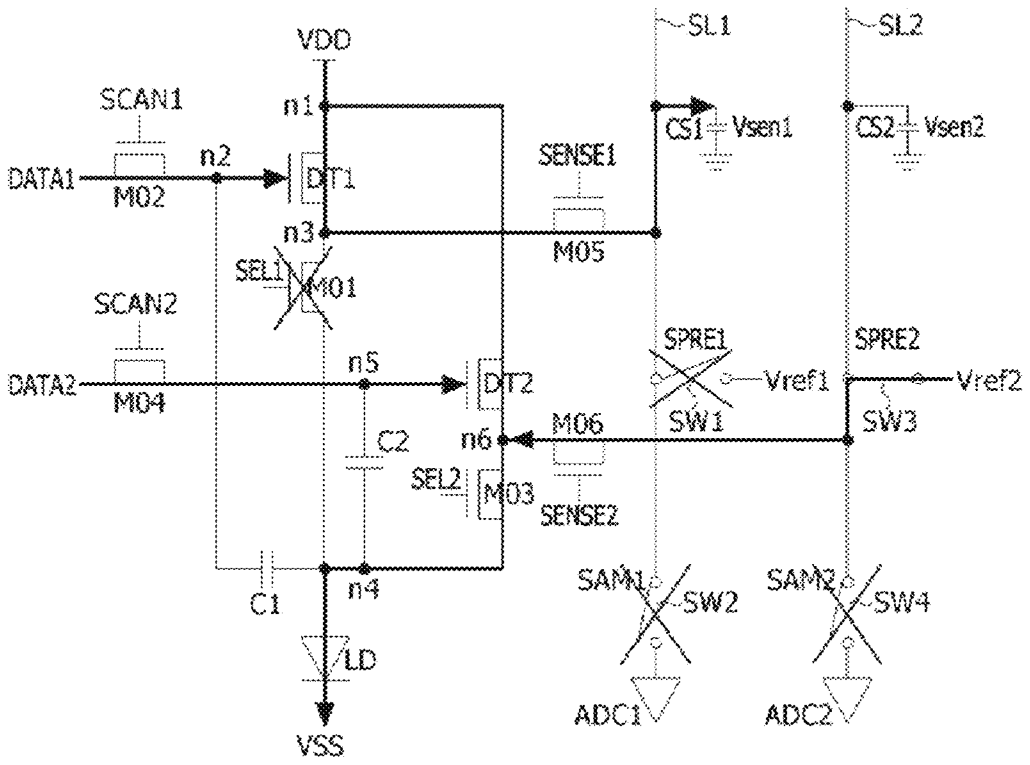
Figure 6C:
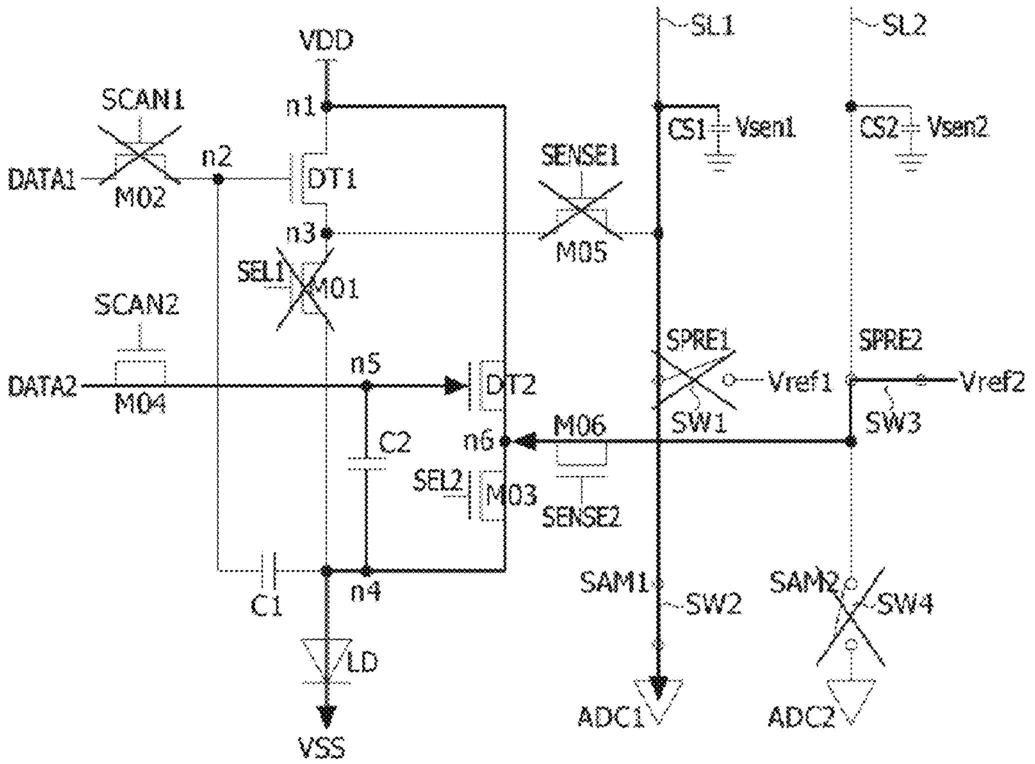

FIG. 5 is a waveform diagram illustrating signals input to the pixel circuit illustrated in FIG. 2 during the second drive period TDRV2. FIGS. 6A to 6C are circuit diagrams illustrating the operation of the pixel circuit illustrated in FIG. 2 in stages during the second driving period TDRV2. In FIG. 5, 'H' is the gate-on voltage of the switch control signals and 'L' is the gate-off voltage of the switch control signals. In FIGS. 6A to 6C, the bold lines represent the current flowing through the turned-on switch elements.

During the second driving period TDRV2, the second driving element DT2 is driven and the first driving element DT1 is sensed. For example, the light-emitting element LD may be driven by the second driving element DT2 and the first driving element DT1 is sensed by the first sensing part SU1. The second driving period TDRV2 may be divided into a first period t21, a second period t22, and a third period t23, as illustrated in FIG. 5, without being limited thereto.

As illustrated in FIG. 5, during the second driving period TDRV2, the first selection signal SEL1 is the gate-off voltage VGL, while the second selection signal SEL2 is the gate-on voltage VGH. Therefore, during the second driving period TDRV2, the third switch element M03 is turned on, and the first switch element M01 is in the off-state. Specifically, during the second driving period TDRV2, the third switch element M03 is turned on in response to the gate-on voltage VGH of the second selection signal SEL2, while the first switch element M01 is turned off in response to the gate-off voltage VGL of the first selection signal SEL1.

Referring to FIG. 5 and FIG. 6A, during the first period t21, the voltages of the first and second scan signals SCAN1 and SCAN2, the first and third switch control signals SPRE1 and SPRE2, and the second sensing signal SENSE2 are the gate-on voltage (VGH, H). Therefore, during the first period t21, the second switch element M02, the third switch element M03, the fourth switch element M04, the second sensing switch element M06, the first initialization switch element SW1, and the second initialization switch element SW3 are turned on. At this time, the first data voltage DATA1 is charged in the first capacitor C1, and the second data voltage DATA2 is charged in the second capacitor C2.

During the first period t21, the voltages of the first sensing signal SENSE1, the first switch control signal SAM1, and the fourth switch control signal SAM2 are the gate-off voltage (VGL, L). Therefore, during the first period t21, the first switch element M01, the first sensing switch element M05, the first sampling switch element SW2, and the second sampling switch element SW4 are turned off.

During the first period t21, the first switch element M01 is turned off, and the third, fourth switch elements M03, M04 are turned on. During the first period t21, a current path may be formed between the driving voltage VDD and the cathode voltage VSS through the second driving element DT2 and the third switch element M03, so that the light-emitting element LD may be driven by the second driving element DT2, while the first driving part DRV1 may be sensed. In this case, the light intensity of the light-emitting element LD may be adjusted according to the second data voltage DATA2. At the same time, during the first period t21, the first sensing voltage Vsen1 is input to the first ADC ADC1, which outputs the first sensing data.

Referring to FIG. 5 and FIG. 6B, during the second period t22, the voltages of the first and second scan signals SCAN1 and SCAN2, the third switch control signal SPRE2, the first sensing signal SENSE1, and the second sensing signal SENSE2 are the gate-on voltages (VGH, H.) Therefore, during the second period t22, the second switch element M02, the third switch element M03, the fourth switch element M04, the first sensing switch element M05, the second sensing switch element M06, and the second initialization switch element SW3 are turned on.

During the second period t22, the voltages of the first switch control signal SPRE1, the second switch control signal SAM1, and the fourth switch control signal SAM2 are the gate-off voltage (VGL, L). Therefore, during the second period t22, the first switch element M01, the first initialization switch element SW1, the first sampling switch element SW2, and the second sampling switch element SW4 are turned off.

During the second period t22, the voltage of the third node n3 may rise, and the level of the rise may be different depending on the electrical characteristic of the first driving element DT1. At this time, the first sensing voltage Vsen1 sensed from the third node n3 is charged in the first sensing capacitor CS1. The first sensing voltage Vsen1 may be higher or lower than the first data voltage DATA1 depending on the electrical characteristic of the first driving element DT1.

During the second period t22, the first switch element M01 is turned off, and the third, fourth switch elements M03, M04 are turned on. During the second period t22, a current path may be formed between the driving voltage VDD and the cathode voltage VSS through the second driving element DT2 and the third switch element M03, so that the light-emitting element LD may be driven by the second driving element DT2, while the first driving part DRV1 may be sensed. In this case, the light intensity of the light-emitting element LD may be adjusted according to the second data voltage DATA2. At the same time, during the second period t22, the first sensing voltage Vsen1 is input to the first ADC ADC1, which outputs the first sensing data.

Referring to FIG. 5 and FIG. 6C, during the third period t23, the voltages of the second scan signal SCAN2, the third switch control signal SPRE2, the second sensing signal SENSE2, and the second switch control signal SAM1 are the gate-on voltage (VGH, H). Therefore, during the third period t23, the third switch element M03, the fourth switch element M04, the second sensing switch element M06, the second initialization switch element SW3, and the first sampling switch element SW2 are turned on.

During the third period t23, the voltages of the first scan signal SCAN1, the first sensing signal SENSE1, the fourth switch control signal SAM2, and the first switch control signal SPRE1 is the gate-off voltage (VGL, L). Therefore, during the third period t23, the first switch element M01, the second switch element M02, the first sensing switch element M05, the first initialization switch element SW1, and the second sampling switch element SW4 are turned off.

During the third period t23, the first switch element M01 is turned off, and the third, fourth switch elements M03, M04 are turned on. During the third period t23, a current path may be formed between the driving voltage VDD and the cathode voltage VSS through the second driving element DT2 and the third switch element M03, so that the light-emitting element LD may be driven by the second driving element DT2, while the first driving part DRV1 may be sensed. In this case, the light intensity of the light-emitting element LD may be adjusted according to the second data voltage DATA2. At the same time, during the third period t23, the first sensing voltage Vsen1 is input to the first ADC ADC1, which outputs the first sensing data.

On the other hand, the time at which the light-emitting element LD is driven by the first driving part DRV1 may be separated from the sensing timing of the second driving part DRV2. Similarly, the time at which the light-emitting element LD is driven by the second driving part DRV2 may be separated from the sensing timing of the first driving part DRV1.

In the pixel circuit according to an exemplary embodiment of the present disclosure, the cathode voltage VSS may be varied to adjust the light emission time of the light-emitting element LD, as illustrated in the examples of FIGS.

3 and 5. For example, the light emission of the light-emitting element LD may be suppressed by increasing the cathode voltage VSS in the first and second periods t11, t12, t21, and t22 of the first and second driving periods TDRV1 and TDRV2. In another exemplary embodiment, a separate switch element may be added between the light-emitting element LD and the switch elements M01 and M03 to switch the current path between the light-emitting element LD and the switch elements M01 and M03, as illustrated in FIG. 7.

Figure 7:
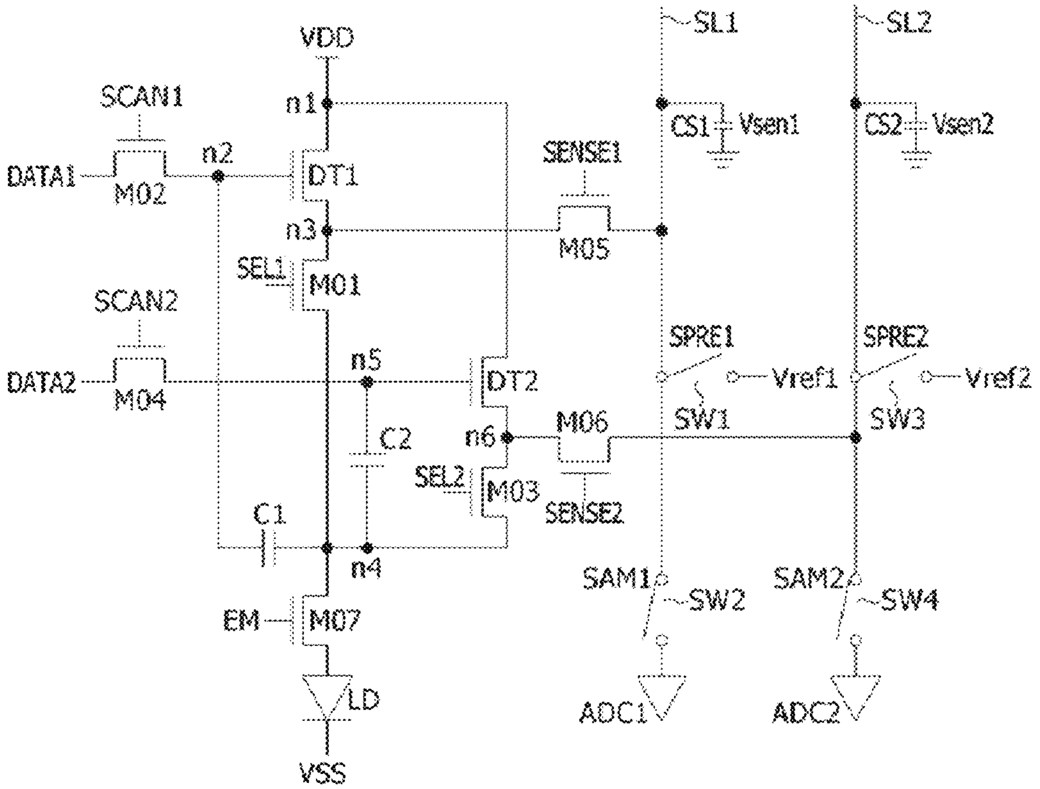
FIG. 7 is a circuit diagram illustrating a pixel circuit according to a second exemplary embodiment of the present disclosure.

FIG. 7 is a circuit diagram illustrating a pixel circuit according to a second exemplary embodiment of the present disclosure. In the circuit illustrated in FIG. 7, substantially the same components as in FIG. 2 are designated by the same reference numerals, and detailed descriptions thereof will be omitted or briefly given. In the pixel circuit illustrated in FIG. 7, the first and second sensing parts SU1 and SU2 may alternately sense the electrical characteristics of the first and second driving elements DT1 and DT2 as illustrated in FIGS. 3 to 6A. During a first driving period, the first driving part DRV1 may drive the light-emitting element LD, while the second driving part DRV2 may be sensed by the second sensing part SU2. During a second driving period, the second driving part DRV2 may drive the light-emitting element LD, while the first driving part DRV1 may be sensed by the first sensing part SU1.

Referring to FIG. 7, in addition to the components shown in the exemplary embodiment of FIG. 2, the pixel circuit may further include a fifth switch element M07 that connects the fourth node n4 to an anode electrode of the light-emitting element LD in response to a light emission signal (hereinafter referred to as an "EM signal"), without being limited thereto. The fifth switch element M07 may be implemented as a transistor, without being limited thereto.

The gate driving circuit may further include, but is not limited to, a seventh shift register that sequentially supplies the EM signal EM to seventh gate lines.

The fifth switch element M07 may be connected between the fourth node n4 and the anode electrode of the light-emitting element LD. The fifth switch element M07 is turned on or off in response to the EM signal EM. For example, the fifth switch element M07 is turned on in response to the gate-low voltage VGL of the EM signal EM, and turned off in response to the gate-high voltage VGH of the EM signal EM, without being limited thereto. When the fifth switch element M07 is turned on, the fourth node n4 may be electrically connected to the anode electrode of the light-emitting element LD to supply current to the light-emitting element LD so that the light-emitting element LD emits light. When the fifth switch element M07 is turned off in response to the gate-off voltage of the EM signal EM, a current path between the fourth node n4 and the light-emitting element LD is electrically disconnected so that the light-emitting element LD does not emit light. The fifth switch element M07 includes a first electrode connected to the fourth node n4, a gate electrode to which the EM signal EM is applied, and a second electrode connected to the anode electrode of the light-emitting element LD.

The fifth switch element M07 may be turned off in the first and second periods t11, t12, t21, and t22 of the first and second driving periods TDRV1 and TDRV2, but is not limited thereto. The luminance of the light-emitting element LD may be adjusted by adjusting the duty ratio of the EM signal EM.

Figure 8A:
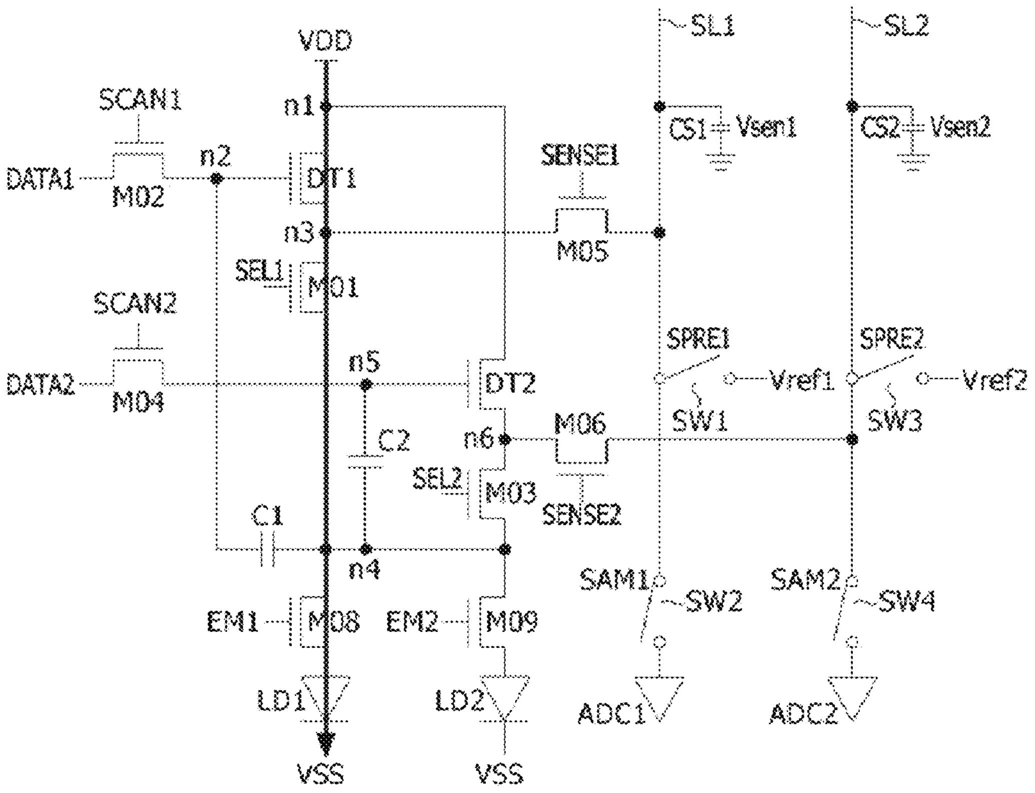
FIGS. 8A and 8B are circuit diagrams illustrating the pixel circuit according to a third exemplary embodiment of the present disclosure.
Figure 8B:
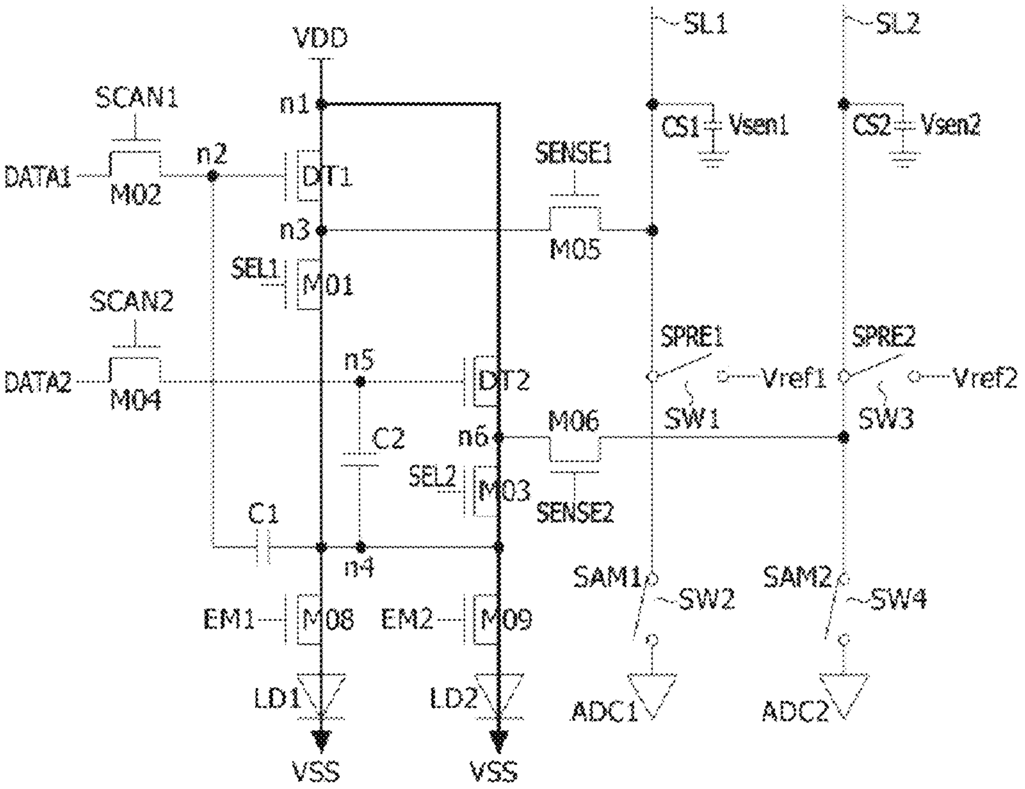

FIGS. 8A and 8B are circuit diagrams illustrating the pixel circuit according to a third exemplary embodiment of the present disclosure. In the circuit illustrated in FIGS. 8A and 8B, substantially the same components as in FIG. 2 are designated by the same reference numerals, and detailed descriptions thereof will be omitted or briefly given. In the circuit illustrated in FIGS. 8A and 8B, the first and second sensing parts SU1 and SU2 may alternately sense the electrical characteristics of the first and second driving elements DT1 and DT2 as illustrated in FIGS. 3 to 6A. During a first driving period, the first driving part DRV1 may drive the light-emitting element LD, while the second driving part DRV2 may be sensed by the second sensing part SU2. During a second driving period, the second driving part DRV2 may drive the light-emitting element LD, while the first driving part DRV1 may be sensed by the first sensing part SU1.

Referring to FIGS. 8A and 8B, in addition to the components shown in the exemplary embodiment of FIG. 2, the pixel circuit may further include a fifth switch element M08, a sixth switch element M09, a first light-emitting element LD1, and a second light-emitting element LD2, without being limited thereto. The fifth and sixth switch elements M08 to M09 may be implemented as a transistor, without being limited thereto.

The gate driving circuit may further include, but is not limited to, a seventh shift register that sequentially supplies a first EM signal EM1 to the seventh gate lines, and an eighth shift register that sequentially supplies a second EM signal EM2 to eight gate lines.

The fifth switch element M08 may be connected between the fourth node n4 and the anode electrode of the first light-emitting element LD1. The fifth switch element M08 is turned on or off in response to the first EM signal EM1. For example, the fifth switch element M08 is turned on in response to the gate-on voltage VGH of the first EM signal EM1, and turned off in response to the gate-off voltage VGL of the first EM signal EM1. When the fifth switch element M08 is turned on, the fourth node n4 may be electrically connected to the anode electrode of the first light-emitting element LD1 to supply current to the first light-emitting element LD1 so that the first light-emitting element LD1 emits light. When the fifth switch element M08 is turned off in response to the gate-off voltage of the first EM signal EM1, a current path between the fourth node n4 and the first light-emitting element LD1 is electrically disconnected so that the first light-emitting element LD1 does not emit light. The fifth switch element M08 includes a first electrode connected to the fourth node n4, a gate electrode to which the first EM signal EM1 is applied, and a second electrode connected to the anode electrode of the first light-emitting element LD1.

The sixth switch element M09 may be connected between the fourth node n4 and an anode electrode of the second light-emitting element LD2. The sixth switch element M09 is turned on or off in response to the first EM signal EM2. For example, the sixth switch element M09 is turned on in response to the gate-on voltage VGH of the first EM signal EM2, and turned off in response to the gate-off voltage VGL of the first EM signal EM2. When the sixth switch element M09 is turned on, the fourth node n4 may be electrically connected to the second light-emitting element LD2 to supply current to the second light-emitting element LD2 so that the second light-emitting element LD2 emits light. When the sixth switch element M09 is turned off in response to the gate-off voltage of the second EM signal EM2, a current path between the fourth node n4 and the second light-emitting element LD2 is electrically disconnected so that the second light-emitting element LD2 does not emit light. The sixth switch element M09 includes a first electrode connected to the fourth node n4, a gate electrode to which the second EM signal EM2 is applied, and a second electrode connected to the anode electrode of the second light-emitting element LD2.

When the first, second, and fifth switch elements M01, M02, and M08 are turned on among the transistors belonging to the first driving part DRV1 and at least the sixth switch element M09 is turned off among the transistors belonging to the second driving part DRV2, only the first light-emitting element LD1 may be emitted. At the same time, the electrical characteristic of the second driving element DT2 may be sensed. On the other hand, only the second light-emitting element LD2 may be emitted when the third, fourth, and sixth switch elements M03, M04, and M09 are turned on among the transistors belonging to the second driving part DRV2 and at least the fifth switch element M08 is turned off among the transistors belonging to the first driving part DRV1. At the same time, the electrical characteristic of the first driving element DT1 may be sensed.

When the first to sixth switch elements M01 to M04, M08, and M09 are turned on simultaneously, the first and second light-emitting elements LD1 and LD2 may be emitted simultaneously.

In this exemplary embodiment, while at least one of the light-emitting elements LD1 and LD2 is driven by the corresponding driving elements DT1 and DT2, the electrical characteristic of the other may be sensed in real time and both light-emitting elements LD1 and LD2 may be simultaneously emitted to increase the luminance of the display pixels and/or the local dimming pixels with less current. As a result, not only the deterioration, power consumption, and lifetime of the driving elements DT1 and DT2 and light-emitting elements LD1 and LD2 may be improved, but also HDR (High Dynamic Range) images may be reproduced with the highest possible luminance and high contrast ratio.

Figure 9:
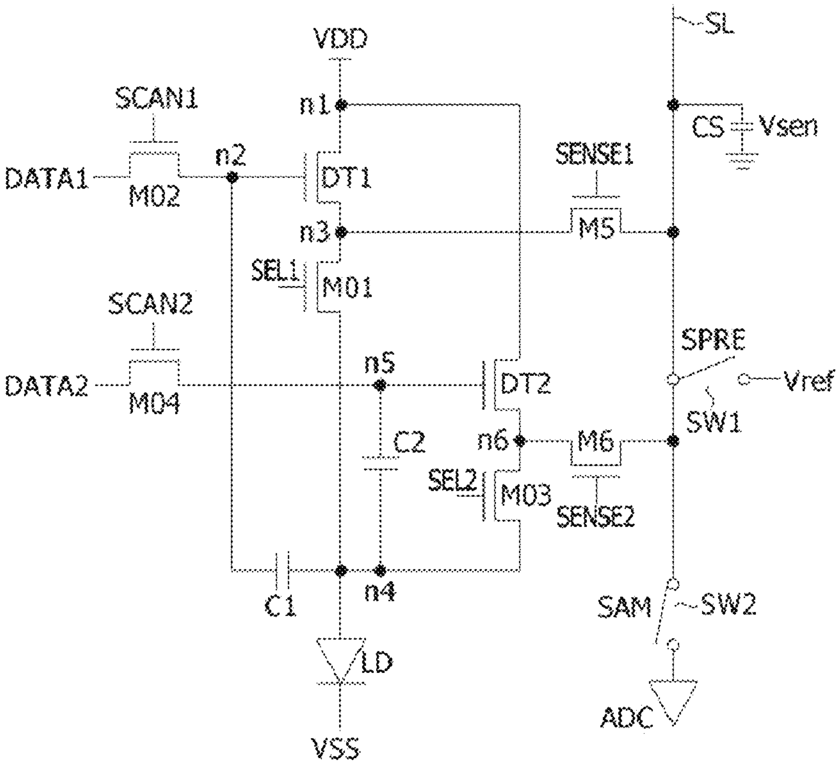
FIG. 9 is a circuit diagram illustrating a pixel circuit according to a third exemplary embodiment of the present disclosure.

FIG. 9 is a circuit diagram illustrating a pixel circuit according to a fourth exemplary embodiment of the present disclosure. In this exemplary embodiment, the circuit configuration of the sensing part may be simplified compared with the. In the circuit illustrated in FIG. 9, substantially the same components as in FIG. 2 are designated by the same reference numerals, and detailed descriptions thereof will be omitted or briefly given.

Referring to FIG. 9, the sensing part of the pixel circuit may include a sensing capacitor CS, a first sensing switch element M5, a second sensing switch element M6, an initialization switch element SW1, a sampling switch element SW2, and an ADC. The sensing part is connected to the third node n3 and the sixth node n6 to sense the electrical characteristics of the first driving element DT1 and the second driving element DT2.

The sensing capacitor CS is connected to the sensing line SL. The first sensing switch element M5 is connected between the third node n3 and the sensing line SL. The first sensing switch element M5 is turned on or off in response to the first sensing signal SENSE1. For example, the first sensing switch element M5 is turned on in response to the gate-on voltage VGH of the first sensing signal SENSE1, and turned off in response to the gate-off voltage VGL of the first sensing signal SENSE1, without being limited thereto. The first sensing switch element M5 is turned on in response to the gate-on voltage VGH of the first sensing signal SENSE1 to connect the third node n3 to the sensing line SL. When the first sensing switch element M5 is turned on, the sensing capacitor CS is charged by the charges from the third node n3. The first sensing switch element M5 includes a first electrode connected to the third node n3, a gate electrode to which the first sensing signal SENSE1 is applied, and a second electrode connected to the sensing line SL.

The second sensing switch element M6 is connected between the sixth node n6 and the sensing line SL. The second sensing switch element M6 is turned on or off in response to the second sensing signal SENSE2. For example, The second sensing switch element M6 is turned on in response to the gate-on voltage VGH of the second sensing signal SENSE2, and turned off in response to the gate-off voltage VGL of the second sensing signal SENSE2, without being limited thereto. The second sensing switch element M6 is turned on in response to the gate-on voltage VGH of the second sensing signal SENSE2 to connect the sixth node n6 to the sensing line SL. When the second sensing switch element M6 is turned on, the sensing capacitor CS is charged by the charges from the sixth node n6. The second sensing switch element M6 includes a first electrode connected to the sixth node n6, a gate electrode to which the second sensing signal SENSE2 is applied, and a second electrode connected to the sensing line SL.

The initialization switch element SW1 is turned on in response to the first switch control signal SPRE to apply the reference voltage Vref to the sensing line SL. The initialization switch element SW1 includes a first electrode connected to the sensing line SL, a gate electrode to which the first control signal SPRE is applied, and a second electrode to which the reference voltage Vref is applied.

The sampling switch element SW2 is turned on in response to the second switch control signal SAM to supply the sensing voltage Vsen charged in the sensing capacitor CS to the ADC. The sampling switch element SW2 includes a first electrode connected to the sensing line SL, a gate electrode to which the second switch control signal SAM is applied, and a second electrode connected to an input terminal of the ADC.

The ADC converts the sensing voltage Vsen, which is input when the sampling switch element SW2 is turned on, into digital data and outputs sensing data.

The switch control signals for controlling the initialization switch element SW1 and the sampling switch element SW2 may be generated from separate controllers, but are not limited thereto.

Figure 10:
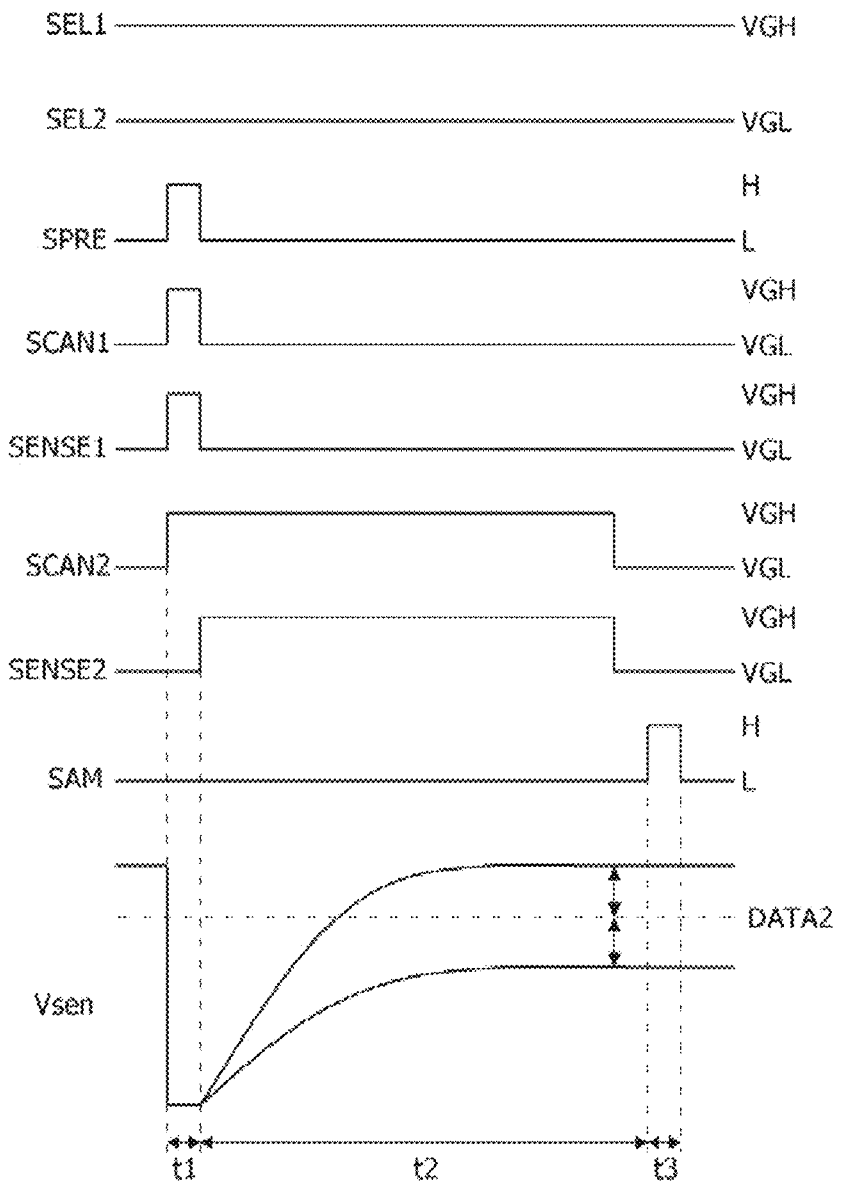
FIG. 10 is a waveform diagram illustrating signals input to the pixel circuit illustrated in FIG. 9.
Figure 11A:
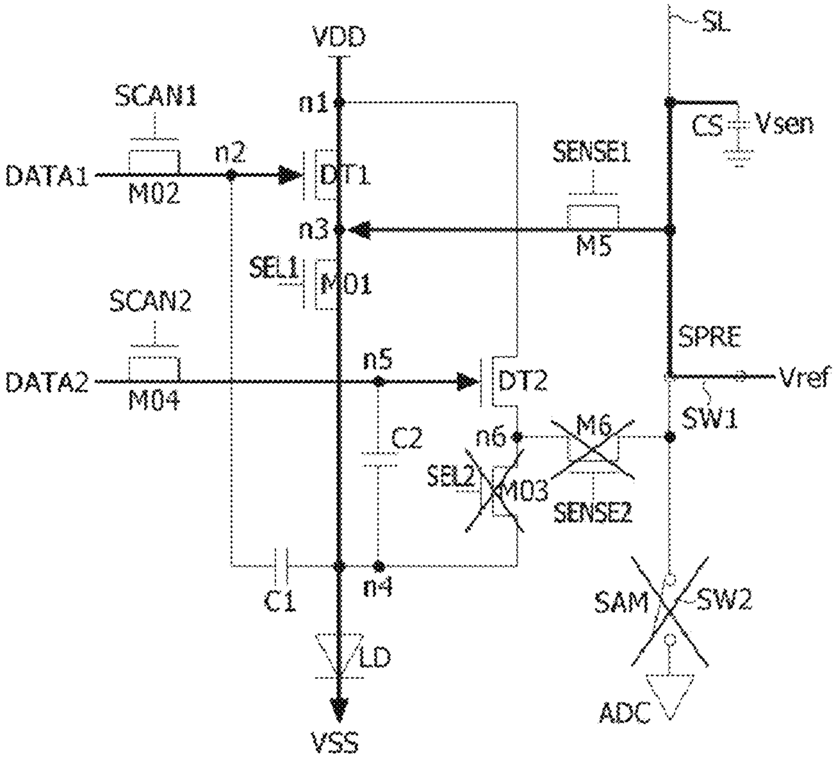
FIGS. 11A to 11C are circuit diagrams illustrating the operation of the pixel circuit illustrated in FIG. 9 in stages.
Figure 11B:
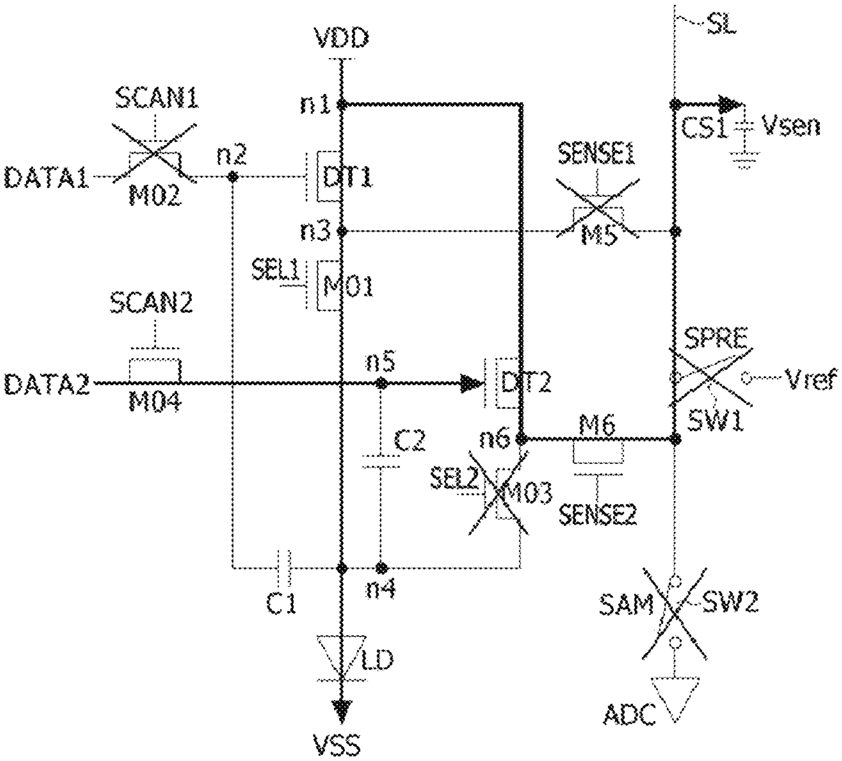
Figure 11C:
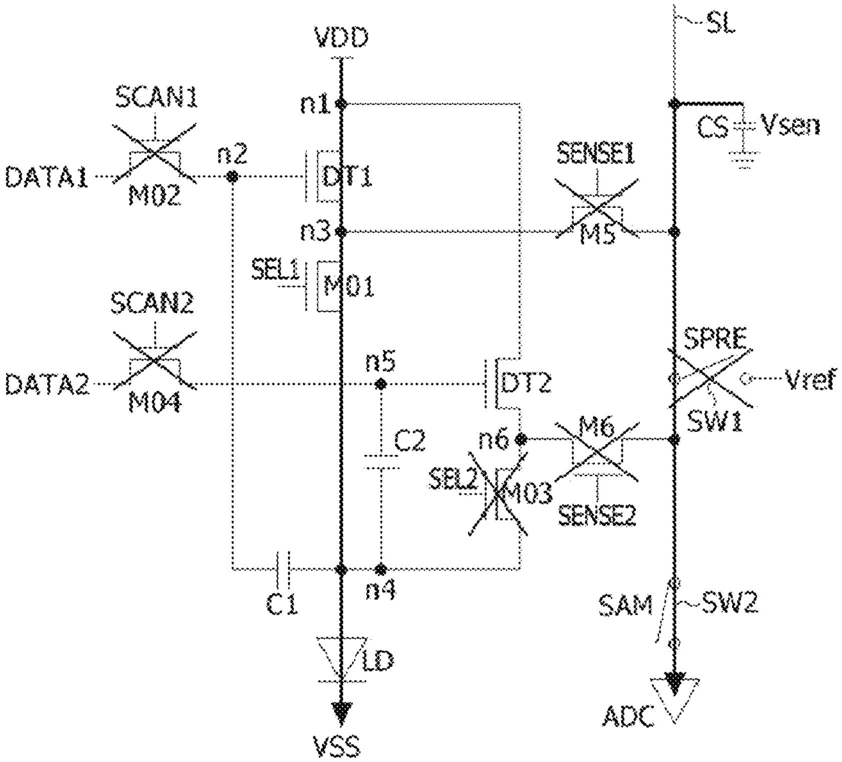

FIG. 10 is a waveform diagram illustrating signals input to the pixel circuit illustrated in FIG. 9. FIGS. 11A to 11C are circuit diagrams illustrating the operation of the pixel circuit shown in FIG. 9 in stages.

As illustrated in FIG. 10, the voltage of the first selection signal SEL1 may be the gate-on voltage VGH, and the voltage of the second selection signal SEL2 may the gate-off voltage VGL, without being limited thereto. Therefore, the first switch element M01 is turned on, while the third switch element M03 is in the off-state. Specifically, the first switch element M01 is turned on in response to the gate-on voltage VGH of the first selection signal SEL1, while the third switch element M03 is turned off in response to the gate-off voltage VGL of the second selection signal SEL2. In this case, the first driving element DT1 may drive the light-emitting element LD, and the electrical characteristic of the second driving element DT2 may be sensed. Alternatively, the voltage of the second selection signal SEL2 may be the gate-on voltage VGH, and the voltage of the first selection signal SEL1 may be the gate-off voltage VGL. In this case, the second driving element DT2 may drive the light-emitting element LD, and the electrical characteristic of the first driving element DT1 may be sensed. FIG. 10 is an example, but not limited to, in which the voltage of the first selection signal SEL1 is the gate-on voltage VGH and the voltage of the second selection signal SEL2 is the gate-off voltage VGL. The example in which the voltage of the second selection signal SEL2 may be the gate-on voltage VGH and the voltage of the first selection signal SEL1 may be the gate-off voltage VGL is not shown.

Referring to FIGS. 10 and 11A, during the first period t1, the voltages of the first selection signal SEL1, the first and second scan signals SCAN1 and SCAN2, the first switch control signal SPRE, and the first sensing signal SENSE1 are the gate-on voltage (VGH, H). Therefore, during the first period t1, the first switch element M01, the second switch element M02, the fourth switch element M04, the first sensing switch element M5, and the initialization switch element SW1 are turned on. At this time, the first data voltage DATA1 is charged in the first capacitor C1, and the second data voltage DATA2 is charged in the second capacitor C2.

During the first period t1, the voltages of the second selection signal SEL2, the second sensing signal SENSE2, and the second switch control signal SAM is the gate-off voltage (VGL, L). Therefore, during the first period t1, the third switch element M03, the second sensing switch element M6, and the sampling switch element SW2 are turned off.

During the first period t1, the first, second switch elements M01, M02 are turned on, and the third switch element M03 is turned off. During the first period t1, a current path may be formed between the driving voltage VDD and the cathode voltage VSS through the first driving element DT1 and the first switch element M01, so that the light-emitting element LD may be driven.

Referring to FIGS. 10 and 11B, during the second period t2, the voltages of the first selection signal SEL1, the second scan signal SCAN2, and the second sensing signal SENSE2 are the gate-on voltage (VGH, H). Therefore, during the second period t2, the first switch element M01, the fourth switch element M04, and the second sensing switch element M6 are turned on.

During the second period t2, the voltages of the second selection signal SEL2, the first scan signal SCAN1, the first sensing signal SENSE1, the first switch control signal SPRE, and the second switch control signal SAM2 is the gate-off voltage (VGL, L). Therefore, during the second period t2, the second switch element M02, the third switch element M03, the first sensing switch element M5, the initialization switch element SW1, and the sampling switch element SW2 are turned off.

Referring to FIG. 10 and FIG. 11C, during the third period t3, the voltages of the first selection signal SEL and the second switch control signal SAM are the gate-on voltage (VGH, H). Therefore, during the third period t3, the first switch element M01 and the sampling switch element SW2 are turned on.

During the third period t3, the voltages of the second selection signal SEL2, the first scan signal SCAN1, the second scan signal SCAN2, the first sensing signal SENSE1, the second sensing signal SENSE2, and the first switch control signal SPRE are the gate-off voltage (VGL, L). Therefore, during the third period t3, the third switch element M03, the second switch element M02, the fourth switch element M04, the first sensing switch element M5, the second sensing switch element M6, and the initialization switch element SW1 are turned off.

In the pixel circuit illustrated in FIG. 10, a separate switch element may be added between the light-emitting element LD and the switch elements M1 and M3. This switch element may connect the fourth node n4 to the anode electrode of the light-emitting element LD in response to the EM signal as illustrated in FIG. 7.

The pixel circuit described above may be applicable to the display pixels of the display panel that displays an input image. Further, the pixel circuit described above may be applicable to the local dimming pixels of a back light unit (BLU) that irradiates light onto a transmissive display panel, without being limited thereto.

Figure 12:
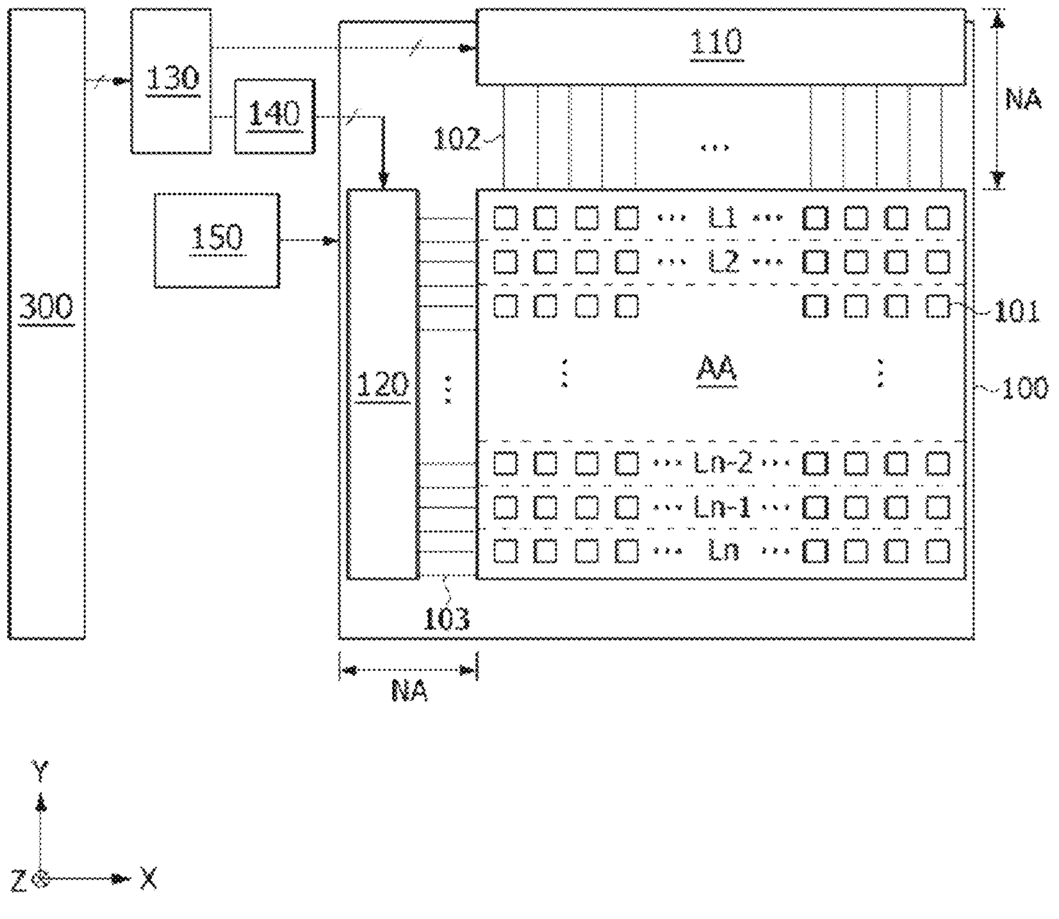
FIG. 12 is a block diagram illustrating a display device according to one exemplary embodiment of the present disclosure.

FIG. 12 is a block diagram illustrating a display device according to one exemplary embodiment of the present disclosure.

Referring to FIG. 12, the display device may include a display panel 100, a display panel driving circuit for writing pixel data to pixels of the display panel 100, and the like. Further, the display device may also include a power supply 150.

The display panel 100 may be, but is not limited to, a panel having a rectangular structure with a length in the X-axis direction, a width in the Y-axis direction, and a thickness in the Z-axis direction. For example, the display panel 100 may be a deformed panel that is at least partially curved or elliptical, without being limited thereto.

A display area AA of the display panel 100 includes a pixel array for displaying an input image thereon. The pixel array includes a plurality of data lines 102, a plurality of gate lines 103 intersecting the data lines 102, and display pixels 101 arranged in a matrix form. The display panel 100 may further include power lines commonly connected to the display pixels 101. The power lines may be commonly connected to pixel circuits and supply voltages required for driving the display pixels 101 to the display pixels 101.

Each of the display pixels 101 may be divided into a red sub-pixel, a green sub-pixel, and a blue sub-pixel for color implementation, without being limited thereto. Each of the display pixels 101 may be divided into other colors of sub-pixels (e.g., cyan, magenta, or yellow, etc.). Each of the display pixels 101 may further include a white sub-pixel. Each sub-pixel includes a display pixel circuit for driving a light-emitting element. The light-emitting element may include an OLED or inorganic LED. Each of the display pixel circuits is connected to the data lines, the gate lines, and the power lines. The display pixel circuit may be implemented as the pixel circuits illustrated in FIGS. 1 to 11C.

The display pixels 101 may be disposed as real color pixels and pentile pixels. The pentile pixels may realize a higher resolution than the real color pixels by driving two sub-pixels having different colors as one display pixel 101 by using a preset pixel rendering algorithm. The pixel rendering algorithm may compensate for insufficient color representation in each display pixel 101 with the color of light emitted from its adjacent display pixel 101.

The display array AA includes a plurality of display pixel lines L1 to Ln. Each of the display pixel lines L1 to Ln includes one line of display pixels 101 disposed in the display area AA of the display panel 100 along a line direction (X-axis direction). The display pixels 101 disposed in one pixel line may share the gate lines 103. The sub-pixels arranged in the column direction (Y-axis direction) along the data line direction may share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be made as a flexible display panel that may be flexibly bent.

The power supply 150 receives an input voltage provided from a host system 300 and outputs the voltages required to drive the display pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output constant voltages (or direct current voltages), such as the gate-on voltage, the gate-off voltage, the pixel driving voltage, the cathode voltage, the reference voltage, an IC driving voltage for the display panel driving circuit, and the like through the DC-DC converter. The gate-on voltage and the gate-off voltage may be supplied to a level shifter 140 and the gate driver 120. The constant voltages such as the pixel driving voltage, the cathode voltage, the reference voltage, and the like are supplied to the display pixels 101 through the power lines commonly connected to the display pixels 101.

The power supply 150 may further include a gamma voltage generator. The gamma voltage generator receives a high potential reference voltage and a low potential reference voltage and outputs a plurality of gamma reference voltages divided by a predetermined voltage interval on a preset gamma curve, for example, 2.2 gamma curve. The gamma reference voltages are supplied to the data driver 110. In the data driver 110, the gamma reference voltages are divided by a voltage division circuit and subdivided into grayscale voltages. The gamma voltage generator may be implemented as a programmable gamma circuit capable of adjusting each of the gamma reference voltages according to digital data. A controller 130 or the host system 300 or a separate external device may update digital data stored in registers of a programmable gamma circuit through a communication interface.

The display panel driving circuit writes the pixel data of the input image to the display pixels 101 of the display panel 100 under the control of the controller 130. The display panel driving circuit may include the data driver 110 and the gate driver 120, without being limited thereto. As in the display apparatus according to one or more exemplary embodiments of the present disclosure, the gate driver 120 may be implemented as a gate in panel (GIP) type and may be directly disposed on the substrate of the display panel. Alternatively, the gate driver 120 can be integrated and arranged on the display panel, or each gate driver 120 can be implemented by a chip-on-film COF method in which an element is mounted on a film connected to the display panel.

Also, the display panel driving circuit may further include a touch sensor driver for driving touch sensors. The touch sensor driver is omitted from FIG. 12. The data driver 110 and the touch sensor driver may be integrated into a source drive integrated circuit (IC).

The data driver 110 receives the pixel data of the input image received as a digital signal from the controller 130 and outputs the data voltage. The data driver 110 may receive the gamma reference voltages and generate gamma compensation voltages for each grayscale through the voltage division circuit. A gamma compensation voltage for each grayscale is supplied to a digital to analog converter ("DAC") disposed on each of the channels of the data driver 110.

The data driver 110 samples and latches the digital data received from the controller 130, and then inputs the digital data to the DAC. The digital data includes pixel data of the input image. The DAC converts the pixel data to the gamma compensation voltage and outputs the data voltage of the pixel data.

The gate driver 120 may be formed on the display panel 100 together with circuit elements of the display area AA and the wires. The gate driver 120 may be disposed in the non-display area NA on at least one of the right or left sides outside the display area AA in the display panel 100, or at least a portion thereof may be disposed within the display area AA, without being limited thereto.

The gate driver 120 may be disposed in the non-display areas NA on both sides of the display panel 100 with the display area AA of the display panel interposed therebetween, and may supply gate pulses from the both sides of the gate lines 103 in a double feeding method. The gate driver 120 may be disposed in at least one of the left and right non-display areas NA of the display panel 100 to supply the gate signal to the gate lines 103 in a single feeding method. The gate driver 120 may shift the pulses of the gate signal using a shift register to sequentially supply them to the gate lines 103. When a plurality of gate signals are applied to each of the display pixels 101, the gate driver 120 may include a plurality of shift registers. The gate signal may include a scan signal input to the pixel circuit via a plurality of gate lines or EM a light emission signal (alternatively referred to as an "EM signal").

The controller 130 receives an input image signal and a timing signal synchronized with the input image signal from the host system 300. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The horizontal synchronization signal Hsync and the data enable signal DE have a period of one horizontal period (1H).

The controller 130 generates a data timing control signal for controlling the operation timing of the data driver 110 and a gate timing control signal for controlling the operation timing of the gate driver 120 based on the timing signals Vsync, Hsync, and DE received from the host system 300 to control the display panel driving circuit. The controller 130 may synchronize the data driver 110 and the gate driver 120 by controlling the operation timing of the display panel driving circuit.

The timing control signal output from the controller 130 may be input to the shift register in the gate driver 120 through the level shifter 140. The level shifter 140 may convert a voltage level of the gate timing signal received from the controller 130 to a swing width between the gate-on voltage and the gate-off voltage and supply it to the gate driver 120.

The controller 130 may include a compensation part that receives sensing data from the sensing part of the display pixel circuit. The compensation part may compensate for deterioration of the electrical characteristics of the first and second driving elements DT1 and DT2 of each of the display pixels 101 by modulating the pixel data based on the sensing data.

Figure 13:
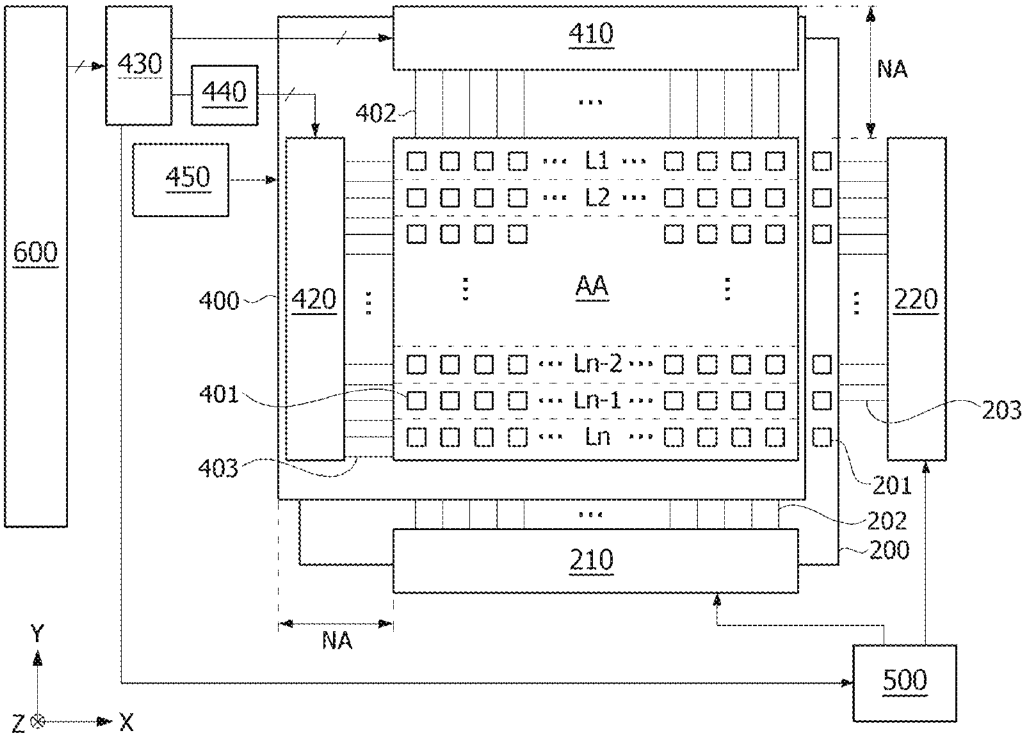
FIG. 13 is a block diagram illustrating a display device according to another exemplary embodiment of the present disclosure.
Figure 14:
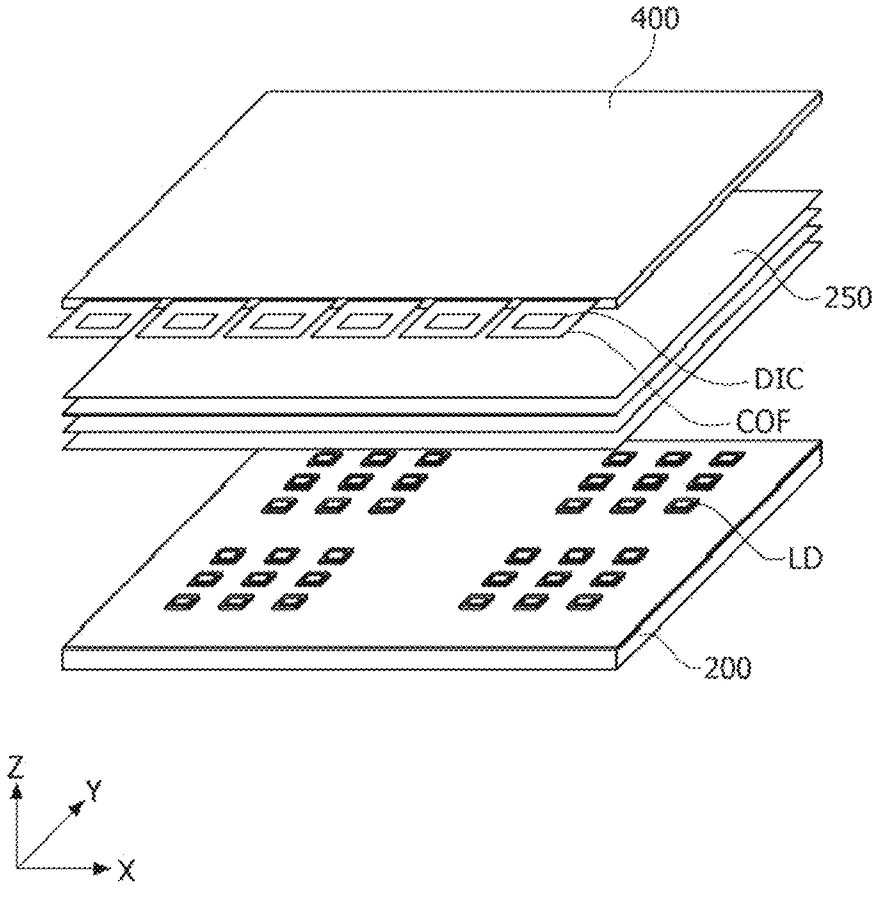
FIG. 14 is a perfective view illustrating a display panel and a backlight unit illustrated in FIG. 13.

FIG. 13 is a block diagram illustrating a display device according to another exemplary embodiment of the present disclosure. FIG. 14 is a perfective view illustrating a display panel and a backlight unit illustrated in FIG. 13.

Referring to FIGS. 13 and 14, the display device may include a display panel 400, a display panel driving circuit for writing pixel data to display pixels 401 of the display panel 400, a backlight unit 200 for irradiating the display panel 400 with light emitted from light-emitting elements LD of local dimming pixels 201, a backlight driving circuit for writing local dimming data to the local dimming pixels 201, and the like.

The display panel 400 may be a transmissive display panel including a liquid crystal layer without light-emitting elements. On the lower transparent substrate of the display panel 400, the data lines 402 and the gate lines 403 are intersected, and the display pixels 401 connected to the data lines 402 and the gate lines 403 are disposed. The display panel 400 may further include power lines commonly connected to the display pixels 401. The power lines may be commonly connected to pixel circuits and supply voltages required for driving the display pixels 401 to the display pixels 401. A black matrix, a color filter, and a common electrode to which a common voltage is applied may be formed on the upper transparent substrate of the display panel 400. The common electrode may be formed on the upper transparent substrate in vertical field driving modes such as TN (Twisted Nematic) mode and VA (Vertical Alignment) mode, and may be disposed together with the pixel electrodes of the display pixels 401 on the lower transparent substrate in horizontal field driving modes such as IPS (In Plane Switching) mode and FFS (Fringe Field Switching) mode.

A polarizer with orthogonal optical axes is attached to each of the upper and lower transparent substrates of the display panel 400. In each of the upper transparent substrate and the lower transparent substrate of the display panel 400, an alignment film for setting a pretilt angle of the liquid crystal is formed on the inner surface in contact with the liquid crystal layer.

Each of the display pixels 401 may be divided into a red sub-pixel, a green sub-pixel, and a blue sub-pixel for color implementation. Each of the display pixels 401 may further include a white sub-pixel, without being limited thereto. Each of the display pixels 401 may be divided into other colors of sub-pixels (e.g., cyan, magenta, or yellow, etc.). The display pixels 401 may be disposed as real color pixels and pentile pixels. Each of the sub-pixels may include a switch element, for example, a TFT, that delivers a data voltage applied to the data lines 402 to the pixel electrode in response to the gate signal from the gate lines 403. Each sub-pixel uses liquid crystal molecules driven by an electric field between the pixel electrode and a common electrode to adjust the light transmittance of light that passes through the polarizer.

A display array AA includes a plurality of display pixel lines L1 to Ln. Each of the display pixel lines L1 to Ln includes one line of display pixels 401 disposed in the display area AA of the display panel 400 along a line direction (X-axis direction). The display pixels 401 disposed in one pixel line may share the gate lines 403. The sub-pixels arranged in the column direction (Y-axis direction) along the data line direction may share the same data line 402.

A power supply 450 receives an input voltage provided from a host system 600 and outputs voltages required to drive the display pixels 401, a display panel driving circuit, local dimming pixels 201, and a backlight driving circuit of the display panel 400. To this end, the power supply 450 may include a direct current to direct current converter (DC-DC converter).

The display panel driving circuit writes the pixel data of the input image to the display pixels 401 of the display panel 400 under the control of a first controller 430. The display panel driving circuit may include a data driver 410 and a gate driver 420, without being limited thereto. Also, the display panel driving circuit may further include a touch sensor driver for driving touch sensors. The touch sensor driver is omitted from FIG. 13. The data driver 410 and the touch sensor driver may be integrated into a source drive integrated circuit (IC).

The data driver 410 receives the pixel data of the input image provided as a digital signal from the first controller 430 and outputs the data voltage. The data voltage output from the data driver 410 is supplied to the data lines 402 of the display panel 400. The circuit of the data driver 410 may be implemented as a drive IC (DIC) and mounted on a flexible film of a chip on film (COF) as illustrated in FIG. 14. The COF may be bonded to the display panel 400 by means of an anisotropic conductive film (ACF), without being limited thereto.

The gate driver 420 outputs pulses of the gate signal while shifting them using a shift register. The pulses of the gate signal output from the gate driver 420 are sequentially supplied to the gate lines 403 of the display panel 400.

The first controller 430 receives an input image signal and a timing signal synchronized with the input image signal from the host system 600. The timing signal may include a vertical synchronization signal Vsync, a horizontal synchronization signal Hsync, and a data enable signal DE. The first controller 430 generates a data timing control signal for controlling the operation timing of the data driver 410 and a gate timing control signal for controlling the operation timing of the gate driver 420 based on the timing signals Vsync, Hsync, and DE received from the host system 300 to control the display panel driving circuit.

The gate timing control signal output from the first controller 430 may be input to the shift register in the gate driver 420 through a level shifter 440. The level shifter 440 may convert a voltage level of the gate timing signal received from the first controller 430 to a swing width between the gate-on voltage and the gate-off voltage and supply it to the gate driver 420.

The first controller 430 or a second controller 500 generates local dimming data from the pixel data of the input image. The local dimming data may be calculated for each block of the display panel 400. The display area AA of the display panel 400 may be virtually divided into a plurality of blocks whose backlight luminance is independently controlled by local dimming. Each of the blocks of the display panel 400 includes a plurality of pixels. The local dimming data may be calculated, but is not limited to, as an average value of the pixel data of the input image in units of the blocks of the display panel 400. The first controller 430 may transmit the pixel data of the input image or the local dimming data to the second controller 500.

The backlight unit 200 includes a plurality of local dimming pixels 201. Each of the local dimming pixels 201 includes a local dimming pixel circuit that drives a corresponding light-emitting element LD. The light-emitting element LD may be implemented as an OLED or inorganic LED, and the present disclosure is not limited thereto. Each of the local dimming pixel circuits is connected to data lines 202, gate lines 203, and power lines. The local dimming pixel circuit may be implemented as the pixel circuits illustrated in FIGS. 1 to 11C.

The light-emitting elements LD of the backlight unit 200 are disposed below the display panel 400, as illustrated in FIG. 14. The backlight unit 200 further includes light-emitting elements LDs of the local dimming pixels 201 and one or more optical sheets 250 disposed between the display panels 400. The optical sheets 250 uniformly irradiate light from the light-emitting elements LD in a direction perpendicular to the face of the display panel 400.

The backlight driving circuit writes the local dimming data to the local dimming pixels 201 under the control of the second controller 500. The backlight driving circuit includes a data driver 210 and a gate driver 220.

The data driver 210 converts the local dimming data received from the second controller 500 into a data voltage and supplies it to the data lines 202 connected to the local dimming pixels 201. The gate driver 220 may shift the pulses of the gate signal using a shift register to sequentially supply them to the gate lines 203.

The second controller 500 may receive the local dimming data from the first controller 430 or the pixel data of the input image from the first controller 430 to generate the local dimming data. The second controller 500 transmits the local dimming data to the data driver 210 and controls the timing of the operation of the data driver 210 and the gate driver 220. The second controller 500 may control the timing of operation of the data driver 210 and the gate driver 220.

The second controller 500 may include a compensation part that receives sensing data from the sensing part of the local dimming pixel circuit. The compensation part may compensate for deterioration of the electrical characteristics of the first and second driving elements DT1 and DT2 of each of the local dimming pixels 201 by modulating the local dimming data based on the sensing data. The second controller 500 may be implemented as a micro-control unit (MCU), but is not limited thereto.

According to one or more exemplary embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more exemplary embodiments of the present disclosure may be applied to organic light emitting lighting devices or inorganic light emitting lighting devices, and the present disclosure is not limited thereto.

The objects to be achieved by the present disclosure, the means for achieving the objects, and effects of the present disclosure described above do not specify essential features of the claims, and thus, the scope of the claims is not limited to the disclosure of the present disclosure.

Although the exemplary embodiments of the present disclosure have been described in more detail with reference to the accompanying drawings, the present disclosure is not limited thereto and may be embodied in many different forms without departing from the technical concept of the present disclosure. Therefore, the exemplary embodiments disclosed in the present disclosure are provided for illustrative purposes only and are not intended to limit the technical concept of the present disclosure. The scope of the technical concept of the present disclosure is not limited thereto. Therefore, it should be understood that the above-described exemplary embodiments are illustrative in all aspects and do not limit the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pixel circuit comprising:

a first driving transistor including a first electrode connected to a first node to which a driving voltage is applied, a gate electrode connected to a second node, and a second electrode connected to a third node;

a second driving transistor including a first electrode connected to the first node, a gate electrode connected to a fifth node, and a second electrode connected to a sixth node;

a sensing part configured to include a sensing capacitor connected to a sensing line and configured to sense electrical characteristics of the first driving transistor and the second driving transistor;

a first capacitor connected between the second node and a fourth node;

a first switch transistor configured to be turned on in response to a first selection signal to connect the third node to the fourth node;

a second switch transistor configured to be turned on in response to a first scan signal to supply a first data voltage to the second node; and a second capacitor connected between the fourth node and the fifth node.

2. The pixel circuit of claim 1, wherein the sensing part includes:

a first sensing part connected to the third node and configured to sense an electrical characteristic of the first driving transistor; and a second sensing part connected to the sixth node and configured to sense an electrical characteristic of the second driving transistor.

3. The pixel circuit of claim 1, further comprising:

a light-emitting element connected to the fourth node.

4. The pixel circuit of claim 2, wherein the first sensing part includes:

a first sensing capacitor connected to a first sensing line;

a first sensing switch transistor configured to be turned on in response to a first sensing signal to connect the third node to the first sensing line;

a first initialization switch element configured to be turned on in response to a first switch control signal to supply a first reference voltage to the first sensing line;

a first analog to digital converter configured to convert a first sensing voltage input through the first sensing line into digital data; and a first sampling switch element configured to be turned on in response to a second switch control signal to connect the first sensing line to an input terminal of the first analog to digital converter, and wherein the second sensing part includes:

a second sensing capacitor connected to a second sensing line;

a second sensing switch transistor configured to be turned on in response to a second sensing signal to connect the sixth node to the second sensing line;

a second initialization switch element configured to be turned on in response to a third switch control signal to supply a second reference voltage to the second sensing line;

a second analog to digital converter configured to convert a second sensing voltage input through the second sensing line into digital data; and a second sampling switch element configured to be turned on in response to a fourth switch control signal to connect the second sensing line to an input terminal of the second analog to digital converter.

5. The pixel circuit of claim 4, wherein:

during a first driving period, the first driving transistor is driven and the second driving transistor is sensed, during a second driving period, the second driving transistor is driven and the first driving transistor is sensed.

6. The pixel circuit of claim 5, wherein:

during the first driving period, a light-emitting element connected to the fourth node is driven by the first driving transistor, and the second driving transistor is sensed by the second sensing part, and during the second driving period, the light-emitting element is driven by the second driving transistor and the first driving transistor is sensed by the first sensing part.

7. The pixel circuit of claim 5, wherein:

during the first driving period, a voltage of the first selection signal is a gate-on voltage, and a voltage of the second selection signal is a gate-off voltage, and during the second driving period, the voltage of the second selection signal is the gate-on voltage and the voltage of the first selection signal is the gate-off voltage.

8. The pixel circuit of claim 7, wherein:

during the first driving period, the first switch transistor is configured to be turned on in response to the gate-on voltage of the first selection signal, and the second switch transistor is configured to be turned off in response to the gate-off voltage of the second selection signal; and during the second driving period, the first switch transistor is configured to be turned off in response to the gate-off voltage of the first selection signal, and the second switch transistor is configured to be turned on in response to the gate-on voltage of the second selection signal.

9. The pixel circuit of claim 5, wherein:

during the first driving period, the first switch transistor and the second switch transistor are configured to be turned on, while the third switch transistor is configured to be turned off.

10. The pixel circuit of claim 9, wherein:

during a first period of the first driving period, the first switch transistor, the second switch transistor, the fourth switch transistor, the first sensing switch transistor, the first initialization switch element, and the second initialization switch element are configured to be turned on, while the third switch transistor, the second sensing switch transistor, the first sampling switch element, and the second sampling switch element are configured to be turned off, during a second period of the first driving period, the first switch transistor, the second switch transistor, the fourth switch transistor, the first sensing switch transistor, the second sensing switch transistor, and the first initialization switch element are configured to be turned on, while the third switch transistor, the second initialization switch element, the first sampling switch element, and the second sampling switch element are configured to be turned off, and during a third period of the first driving period, the first switch transistor, the second switch transistor, the first sensing switch transistor, the first initialization switch element, and the second sampling switch element are configured to be turned on, while the third switch transistor, the fourth switch transistor, the second sensing switch transistor, the second initialization switch element, and the first sampling switch element are configured to be turned off.

11. The pixel circuit of claim 10, wherein:

during the second driving period, the third switch transistor, the fourth switch transistor are configured to be turned on, while the first switch transistor is configured to be turned off.

12. The pixel circuit of claim 10, wherein:

during a first period of the second driving period, the second switch transistor, the third switch transistor, the fourth switch transistor, the second sensing switch transistor, the first initialization switch element, and the second initialization switch element are configured to be turned on, while the first switch transistor, the first sensing switch transistor, the first sampling switch element, and the second sampling switch element are configured to be turned off, during a second period of the second driving period, the second switch transistor, the third switch transistor, the fourth switch transistor, the first sensing switch transistor, the second sensing switch transistor, and the second initialization switch element are configured to be turned on, while the first switch transistor, the first initialization switch element, the first sampling switch element, and the second sampling switch element are configured to be turned off, and during a third period of the second driving period, the third switch transistor, the fourth switch transistor, the second sensing switch transistor, the second initialization switch element, and the first sampling switch element are configured to be turned on, while the first switch transistor, the second switch transistor, the first sensing switch transistor, the first initialization switch element, and the second sampling switch element are configured to be turned off.

13. The pixel circuit of claim 1, further comprising:

a light-emitting element connected to the fourth node; and a fifth switch transistor connected between the fourth node and the light-emitting element and configured to connect the fourth node to an anode electrode of the light-emitting element in response to a light emission signal.

14. The pixel circuit of claim 1, further comprising:

a first light-emitting element including an anode electrode and a cathode electrode;

a second light-emitting element including an anode electrode and a cathode electrode;

a fifth switch element configured to be turned on in response to a first light emission signal to connect the fourth node to the anode electrode of the first light-emitting element; and a sixth switch element configured to be turned on in response to a second light emission signal to connect the fourth node to the anode electrode of the second light-emitting element.

15. The pixel of claim 1, wherein the sensing part is connected to the third node and the sixth node.

16. The pixel circuit of claim 15, further comprising:

a light-emitting element connected to the fourth node.

17. The pixel circuit of claim 15, wherein the sensing part includes:

a sensing capacitor connected to a sensing line;

a first sensing switch transistor configured to be turned on in response to a first sensing signal to connect the third node to the sensing line;

a second sensing transistor configured to be turned on in response to a second sensing signal to connect the sixth node to the sensing line;

an initialization switch element configured to be turned on in response to a first switch control signal to supply a reference voltage to the sensing line;

an analog to digital converter configured to convert a sensing voltage input through the sensing line into digital data; and a sampling switch element configured to be turned on in response to a second switch control signal to connect the sensing line to an input terminal of the analog to digital converter.

18. A display device comprising:

a display panel in which a plurality of data lines, a plurality of gate lines, and plurality of display pixels are disposed, wherein each of the display pixels includes:

a first driving transistor including a first electrode connected to a first node to which a driving voltage is applied, a gate electrode connected to a second node, and a second electrode connected to a third node;

a second driving transistor including a first electrode connected to the first node, a gate electrode connected to a fifth node, and a second electrode connected to a sixth node;

a sensing part configured to include a sensing capacitor connected to a sensing line and configured to sense electrical characteristics of the first driving transistor and the second driving transistor;

a first capacitor connected between the second node and a fourth node;

a first switch transistor configured to be turned on in response to a first selection signal to connect the third node to the fourth node;

a second switch transistor configured to be turned on in response to a first scan signal to supply a first data voltage to the second node; and a second capacitor connected between the fourth node and the fifth node.

19. A display device comprising:

a display panel to which pixel data of an input image are written; and a backlight unit in which a plurality of local dimming pixels that irradiate light to the display panel is disposed, wherein each of the local dimming pixels includes:

a first driving transistor including a first electrode connected to a first node to which a driving voltage is applied, a gate electrode connected to a second node, and a second electrode connected to a third node;

a second driving transistor including a first electrode connected to the first node, a gate electrode connected to a fifth node, and a second electrode connected to a sixth node;

a sensing part configured to include a sensing capacitor connected to a sensing line and configured to sense electrical characteristics of the first driving transistor and the second driving transistor;

a first capacitor connected between the second node and a fourth node;

a first switch transistor configured to be turned on in response to a first selection signal to connect the third node to the fourth node;

a second switch transistor configured to be turned on in response to a first scan signal to supply a first data voltage to the second node; and a second capacitor connected between the fourth node and the fifth node.

* * * * *